United States Patent [19]
Kobayashi

[11] Patent Number: 5,742,834
[45] Date of Patent: Apr. 21, 1998

[54] DOCUMENT PROCESSING APPARATUS USING A SYNONYM DICTIONARY

[75] Inventor: Nobutsune Kobayashi, Tokyo, Japan

[73] Assignee: Canon Kabushiki Kaisha, Tokyo, Japan

[21] Appl. No.: 691,433

[22] Filed: Aug. 2, 1996

Related U.S. Application Data

[63] Continuation of Ser. No. 80,625, Jun. 24, 1993, abandoned.

[30] Foreign Application Priority Data

| Jun. 24, 1992 | [JP] | Japan | 4-165780 |
| Jul. 9, 1992 | [JP] | Japan | 4-182344 |
| Jul. 10, 1992 | [JP] | Japan | 4-206176 |

[51] Int. Cl.$^6$ .................................................. G06F 17/27
[52] U.S. Cl. .................... 395/760; 395/792; 395/803
[58] Field of Search ............................. 395/792–804, 395/754–755, 760

[56] References Cited

U.S. PATENT DOCUMENTS

| 4,342,085 | 7/1982 | Glickman et al. | 364/419.11 |
| 4,384,329 | 5/1983 | Rosenbaum et al. | 364/419.12 |
| 4,744,050 | 5/1988 | Hirosawa et al. | 364/419.04 |
| 4,773,039 | 9/1988 | Zamora | 364/419.13 |
| 4,811,273 | 3/1989 | Kishimoto | 364/419.11 |
| 4,888,730 | 12/1989 | McRae et al. | 364/419.13 |
| 4,923,314 | 5/1990 | Blanchard, Jr. et al. | 364/419.12 |
| 5,007,019 | 4/1991 | Squillante et al. | 364/419.11 |
| 5,148,367 | 9/1992 | Saito et al. | 364/419.12 |
| 5,297,039 | 3/1994 | Kamaegami et al. | 364/419.13 |

OTHER PUBLICATIONS

"Automatic Patent System Text Search and Retreival", Jun. 1989, pp. B4–1 and B4–2.

Primary Examiner—Jack B. Harvey
Assistant Examiner—Xuong M. Chunk-Trans
Attorney, Agent, or Firm—Fitzpatrick, Cella, Harper & Scinto

[57] ABSTRACT

A document processing apparatus uses a synonym dictionary to substitute words and phtrases in a document by other synonymous words and phrases. At this juncture, the frequency of use of the words in a document is counted, and the words which have more frequency of use are made the objects of the substitution. Also, the words having more frequency of use are removed from the substitutional candidates or its priority as the candidate is lowered. When counting the frequency of use, a word which constitutes an idiom is counted as an idiom. Also, a proper noun or other words and phrases which cannot be substituted are excluded from the object of counting.

16 Claims, 33 Drawing Sheets

FIG. 5

SYNONYM CANDIDATE WORD
AND PHRASE LIST OF HEAD
WORD "huge"

| giant, vast, enormous |

FIG. 6

```
FREQUENCY OF USE OF "giant"    = 2 TIMES
FREQUENCY OF USE OF "vast"     = 0 TIME
FREQUENCY OF USE OF "enormous" = 1 TIME
```

FIG. 7

| vast, enormous, giant |

FIG. 10

| vast, enormous, |

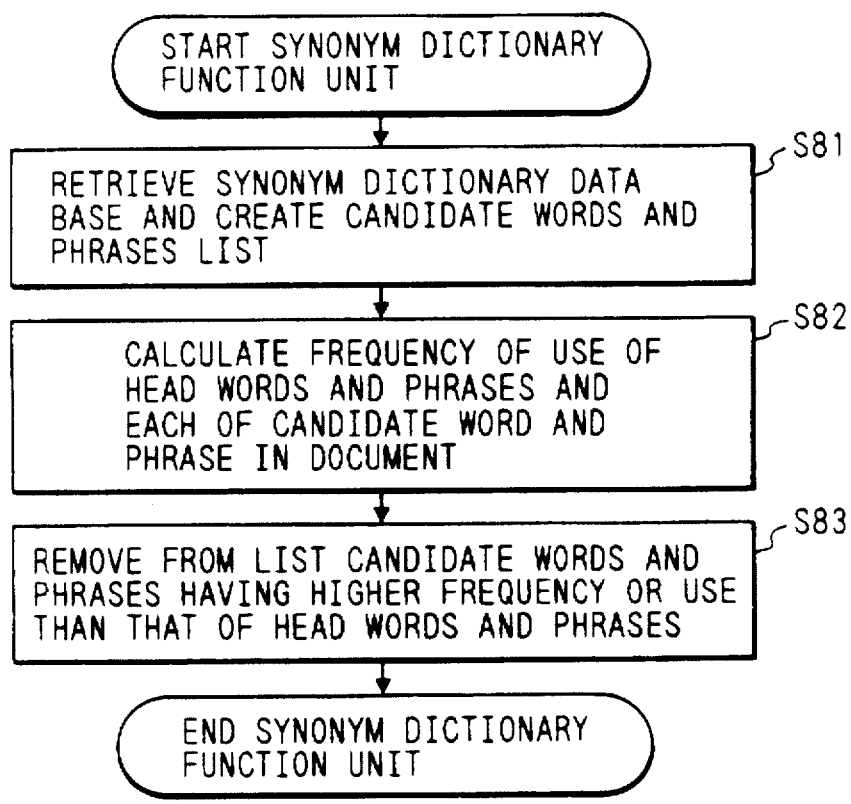

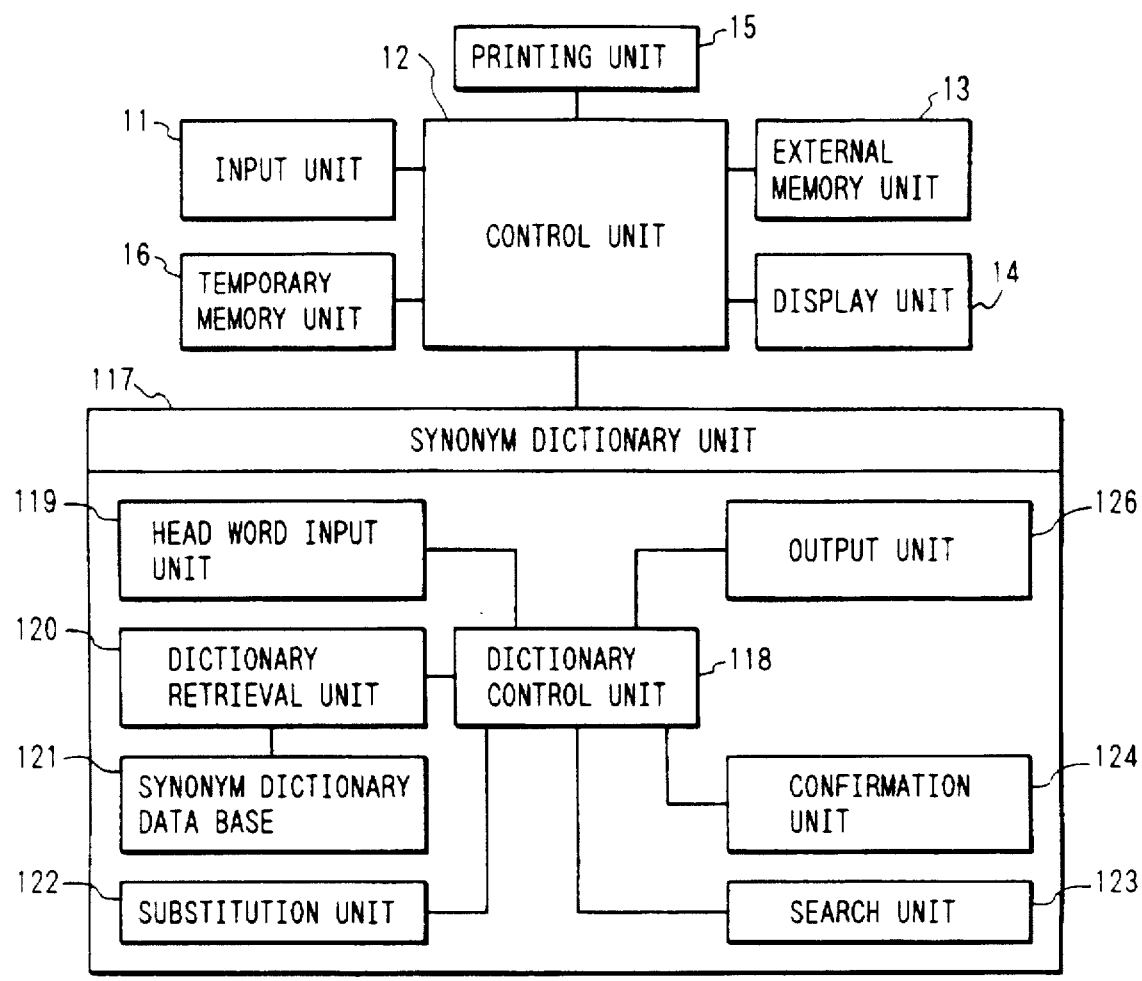

FIG. 14

| HEAD WORDS | SYNONYM CANDIDATE WORDS AND PHRASES |
|---|---|
| animal | physical |
| big | giant, huge, vast |
| but | only |
| create | make, produce |
| curse it | Tut |
| get across | put across |
| giant | big, huge, vast |
| huge | big, giant, vast |
| like | similar |
| make | create, produce |
| make out | understand |
| made over | repaired |
| only | but |
| physical | animal |
| produce | create, make |
| put across | get across |
| repaired | mode over |
| said | told, voiced |
| similar | like |
| told | said, voiced |
| Tut | curse it |
| understand | meke out |
| vast | big, giant, huge, |
| voiced | said, told |

FIG. 15

| HEAD WORDS | SYNONYM CANDIDATE WORDS AND PHRASES |
|---|---|
| produce | create, make |

FIG. 16

Mr. Brown wanted to produce a new coat. But he was very poor, and he gave up to <u>make</u> it.
He tried an old coat on, and said to his wife.
"I want to have this old coat made over."
Mrs. Brown was hard of hearing. She could not <u>make</u> out what he was trying to say.

FIG. 17

Mr. Brown wanted to create a new coat. But he was very poor, and he gave up to make it.
He tried an old coat on, and said to his wife.
"I want to have this old coat made over."
Mrs. Brown was hard of hearing. She could not make out what he was trying to say.

FIG. 18

[1] But he was very poor, and he gave up to make it.
[2] She could not make out what he was trying to say.

FIG. 22

That was a giant animal.
"What a giant panda that is !!", He
said. but, I knew that the animal
was a giant ■

FIG. 23 giant

FIG. 24

That was a giant animal.
"What a giant panda that is !!", He
said. But, I knew that the animal
was a huge bear. A giant ■

FIG. 25

That was a giant animal.
"What a giant panda that is !!", He
said. But, I knew that the animal
was a huge bear. A big bear looks
like a giant panda.

FIG. 27

Mr. Brown wanted to make a new coat. But he was very poor.
"Curse it" ■

FIG. 28

| INPUT WORDS AND PHRASES MEMORY | SUBSTITUTION WORDS AND PHRASES MEMORY |
|---|---|
| Curse it | → Tut |

FIG. 29

Mr. Brown wanted to make a new coat. But he was very poor.
"Tut !"
He talked to himself, and he gave up to make it. He tried an old coat on, and said to his wife.
"I want to have this old coat made over."
Mrs. Brown was hard of hearing. She could not make out what he was trying to say.
"Curse it" ■

FIG. 30

Mr. Brown wanted to make a new coat. But he was very poor.
"Tut !"
He talked to himself, and he gave up to make it. He tried an old coat on, and said to his wife.
"I want to have this old coat made over."
Mrs. Brown was hard of hearing. She could not make out what he was trying to say.
"Tut !".
He said.

FIG. 33

Mr. Brown wanted to make a new coat. But he was very poor, and he gave up to make it.
He tried an old coat on, and said to his wife.
"I want to have this old coat made over."
Mrs. Brown was hard of hearing. She could not make out what he was trying to say.

FIG. 34

| WORDS AND PHRASES NO. | WORDS AND PHRASES | FREQUENCY OF USE | WORDS AND PHRASES NO. | WORDS AND PHRASES | FREQUENCY OF USE |
|---|---|---|---|---|---|
| 1 | he | 4 | 21 | over | 1 |
| 2 | coat | 3 | 22 | poor | 1 |
| 3 | make | 3 | 23 | said | 1 |
| 4 | and | 2 | 24 | say | 1 |
| 5 | Brown | 2 | 25 | She | 1 |
| 6 | old | 2 | 26 | this | 1 |
| 7 | But | 1 | 27 | tried | 1 |
| 8 | could | 1 | 28 | trying | 1 |
| 9 | gave | 1 | 29 | up | 1 |
| 10 | hard | 1 | 30 | very | 1 |
| 11 | have | 1 | 31 | want | 1 |
| 12 | hearing | 1 | 32 | wanted | 1 |
| 13 | his | 1 | 33 | what | 1 |
| 14 | it | 1 | 34 | wife | 1 |
| 15 | made | 1 | | | |
| 16 | Mr. | 1 | | | |
| 17 | Mrs. | 1 | | | |
| 18 | new | 1 | | | |
| 19 | not | 1 | | | |
| 20 | out | 1 | | | |

FIG. 35

| WORDS AND PHRASES NO. | WORDS AND PHRASES | FREQUENCY OF USE | WORDS AND PHRASES NO. | WORDS AND PHRASES | FREQUENCY OF USE |
|---|---|---|---|---|---|
| 1 | he | 4 | 21 | poor | 1 |
| 2 | coat | 3 | 22 | said | 1 |
| 3 | and | 2 | 23 | say | 1 |
| 4 | Brown | 2 | 24 | She | 1 |
| 5 | make | 2 | 25 | this | 1 |
| 6 | old | 2 | 26 | tried | 1 |
| 7 | But | 1 | 27 | trying | 1 |
| 8 | could | 1 | 28 | up | 1 |
| 9 | gave | 1 | 29 | very | 1 |
| 10 | hard | 1 | 30 | want | 1 |
| 11 | have | 1 | 31 | wanted | 1 |
| 12 | hearing | 1 | 32 | what | 1 |
| 13 | his | 1 | 33 | wife | 1 |
| 14 | it | 1 | | | |
| 15 | made over | 1 | | | |
| 16 | make out | 1 | | | |
| 17 | Mr. | 1 | | | |
| 18 | Mrs. | 1 | | | |
| 19 | new | 1 | | | |
| 20 | not | 1 | | | |

FIG. 38

```
Mr. Brown wanted to get a new
coat. But he was very poor, and he
gave up to make it.
He tried an old coat on, and said to
his wife.
 "I want to have this old coat made
over."
But Mrs. Brown was hard of hearing.
and he could not get his idea across.
```

FIG. 39

| WORDS AND PHRASES NO. | WORDS AND PHRASES | FREQUENCY OF USE | WORDS AND PHRASES NO. | WORDS AND PHRASES | FREQUENCY OF USE |
|---|---|---|---|---|---|
| 1 | he | 4 | 21 | new | 1 |
| 2 | and | 3 | 22 | not | 1 |
| 3 | coat | 3 | 23 | over | 1 |
| 4 | Brown | 2 | 24 | poor | 1 |
| 5 | But | 2 | 25 | said | 1 |
| 6 | get | 2 | 26 | this | 1 |
| 7 | his | 2 | 27 | tried | 1 |
| 8 | old | 2 | 28 | up | 1 |
| 9 | across | 1 | 29 | very | 1 |
| 10 | could | 1 | 30 | want | 1 |
| 11 | gave | 1 | 31 | wanted | 1 |
| 12 | hard | 1 | 32 | wife | 1 |
| 13 | have | 1 | | | |
| 14 | hearing | 1 | | | |
| 15 | idea | 1 | | | |
| 16 | it | 1 | | | |
| 17 | made | 1 | | | |
| 18 | make | 1 | | | |
| 19 | Mr. | 1 | | | |
| 20 | Mrs. | 1 | | | |

FIG. 40

| WORDS AND PHRASES NO. | WORDS AND PHRASES | FREQUENCY OF USE | WORDS AND PHRASES NO. | WORDS AND PHRASES | FREQUENCY OF USE |
|---|---|---|---|---|---|
| 1 | he | 4 | 21 | new | 1 |
| 2 | and | 3 | 22 | not | 1 |
| 3 | coat | 3 | 23 | poor | 1 |
| 4 | Brown | 2 | 24 | said | 1 |
| 5 | But | 2 | 25 | this | 1 |
| 6 | his | 2 | 26 | tried | 1 |
| 7 | old | 2 | 27 | up | 1 |
| 8 | could | 1 | 28 | very | 1 |
| 9 | gave | 1 | 29 | want | 1 |
| 10 | get | 1 | 30 | wanted | 1 |
| 11 | get across | 1 | 31 | wife | 1 |
| 12 | hard | 1 | | | |
| 13 | have | 1 | | | |
| 14 | hearing | 1 | | | |
| 15 | idea | 1 | | | |
| 16 | it | 1 | | | |
| 17 | made over | 1 | | | |
| 18 | make | 1 | | | |
| 19 | Mr. | 1 | | | |
| 20 | Mrs. | 1 | | | |

That was a giant animal.
"What a giant panda that is !!", He
said. But, I knew that the amimal
was a huge bear. A huge bear looks
like a giant panda.

FIG. 44

| WORDS AND PHRASES | FREQUENCY OF USE (NUMBER OF OCCURRENCES) |
|---|---|
| a | 5 |
| animal | 2 |
| bear | 2 |
| but | 1 |
| giant | 3 |
| he | 1 |
| huge | 2 |
| I | 1 |
| is | 1 |
| knew | 1 |
| like | 1 |
| looks | 1 |
| panda | 2 |
| said | 1 |
| that | 3 |
| the | 1 |
| was | 2 |
| what | 3 |

FIG. 45

| WORDS AND PHRASES | FREQUENCY OF USE (NUMBER OF OCCURRENCES) |
|---|---|
| animal | 2 |
| but | 1 |
| giant | 3 |
| huge | 2 |
| like | 1 |
| said | 1 |

FIG. 48

| WORDS AND PHRASES NO. | WORDS AND PHRASES | FREQUENCY OF USE (NUMBER OF OCCURRENCES) |
|---|---|---|
| 1 | ———— | ———— |
| 2 | ———— | ———— |
| 3 | ———— | ———— |
| 4 | ———— | ———— |
| 5 | ———— | ———— |
| 6 | ———— | ———— |
| 7 | ———— | ———— |
| 8 | ———— | ———— |
| 9 | ———— | ———— |
| 10 | ———— | ———— |

FIG. 49

That was a giant animal.

FIG. 50

| WORDS AND PHRASES NO. | WORDS AND PHRASES | FREQUENCY OF USE (NUMBER OF OCCURRENCES) |
|---|---|---|
| 1 | a ———— | ———— 1 |
| 2 | animal ———— | ———— 1 |
| 3 | giant ———— | ———— 1 |
| 4 | that ———— | ———— 1 |
| 5 | was ———— | ———— 1 |
| 6 | ———— | ———— |
| 7 | ———— | ———— |
| 8 | ———— | ———— |
| 9 | ———— | ———— |
| 10 | ———— | ———— |

FIG. 51

That was a giant animal.
"What a giant panda that is !!", He
said. But, I knew that the animal
was a huge bear. A huge bear looks
like a giant panda.

FIG. 52

| WORDS AND PHRASES NO. | WORDS AND PHRASES | FREQUENCY OF USE (NUMBER OF OCCURRENCES) |
|---|---|---|
| 1 | a | 2 |
| 2 | animal | 1 |
| 3 | giant | 2 |
| 4 | he | 1 |
| 5 | is | 1 |
| 6 | panda | 1 |
| 7 | said | 1 |
| 8 | that | 2 |
| 9 | was | 1 |
| 10 | what | 1 |

FIG. 53

| WORDS AND PHRASES NO. | WORDS AND PHRASES | FREQUENCY OF USE (NUMBER OF OCCURRENCES) |
|---|---|---|
| 1 | animal | 2 |
| 2 | but | 1 |
| 3 | giant | 3 |
| 4 | huge | 2 |
| 5 | like | 1 |
| 6 | said | 1 |
| 7 | | |
| 8 | | |
| 9 | | |
| 10 | | |

That was a giant animal. I called the animal Tom.
"What a giant panda that is !", he said. But, I knew that Tom was a huge bear. Tom looked like a giant panda.

FIG. 56

| WORDS AND PHRASES | FREQUENCY OF USE (NUMBER OF OCCURRENCES) | WORDS AND PHRASES | FREQUENCY OF USE (NUMBER OF OCCURRENCES) |
|---|---|---|---|
| a | 3 | called | 1 |
| giant | 3 | he | 1 |
| That | 3 | huge | 1 |
| Tom | 3 | is | 1 |
| animal | 2 | knew | 1 |
| I | 2 | like | 1 |
| panda | 2 | looked | 1 |
| was | 2 | said | 1 |
| beat | 1 | the | 1 |
| But | 1 | What | 1 |

FIG. 57

| CONTENTS OF USER DICTIONARY |
|---|
| Tom |

FIG. 58

| WORDS AND PHRASES | FREQUENCY OF USE (NUMBER OF OCCURRENCES) | WORDS AND PHRASES | FREQUENCY OF USE (NUMBER OF OCCURRENCES) |
|---|---|---|---|
| a | 3 | he | 1 |
| giant | 3 | huge | 1 |
| That | 3 | is | 1 |
| animal | 2 | knew | 1 |
| I | 2 | like | 1 |
| panda | 2 | looked | 1 |
| was | 2 | said | 1 |
| bear | 1 | the | 1 |
| But | 1 | What | 1 |
| called | 1 | | |

FIG. 59

| WORDS AND PHRASES NO. | WORDS AND PHRASES | FREQUENCY OF USE (NUMBER OF OCCUR- RENCES) | WORDS AND PHRASES NO. | WORDS AND PHRASES | FREQUENCY OF USE (NUMBER OF OCCUR- RENCES) |
|---|---|---|---|---|---|
| 1 | —— | —— | 11 | —— | —— |
| 2 | —— | —— | 12 | —— | —— |
| 3 | —— | —— | 13 | —— | —— |
| 4 | —— | —— | 14 | —— | —— |
| 5 | —— | —— | 15 | —— | —— |
| 6 | —— | —— | 16 | —— | —— |
| 7 | —— | —— | 17 | —— | —— |
| 8 | —— | —— | 18 | —— | —— |
| 9 | —— | —— | 19 | —— | —— |
| 10 | —— | —— | | | |

FIG. 60

| WORDS AND PHRASES NO. | WORDS AND PHRASES | FREQUENCY OF USE (NUMBER OF OCCUR- RENCES) | WORDS AND PHRASES NO. | WORDS AND PHRASES | FREQUENCY OF USE (NUMBER OF OCCUR- RENCES) |
|---|---|---|---|---|---|
| 1 | a —— | —— 1 | 11 | —— | —— |
| 2 | animal | —— 1 | 12 | —— | —— |
| 3 | giant—— | —— 1 | 13 | —— | —— |
| 4 | That —— | —— 1 | 14 | —— | —— |
| 5 | was —— | —— 1 | 15 | —— | —— |
| 6 | —— | —— | 16 | —— | —— |
| 7 | —— | —— | 17 | —— | —— |
| 8 | —— | —— | 18 | —— | —— |
| 9 | —— | —— | 19 | —— | —— |
| 10 | —— | —— | | | |

FIG. 61

That was a giant animal. I called the animal Tom.
"What a giant panda that is !", he said. But, I knew that Tom was a huge bear. Tom looked like a giant panda

FIG. 62

| WORDS AND PHRASES NO. | WORDS AND PHRASES | FREQUENCY OF USE (NUMBER OF OCCURRENCES) | WORDS AND PHRASES NO. | WORDS AND PHRASES | FREQUENCY OF USE (NUMBER OF OCCURRENCES) |
|---|---|---|---|---|---|
| 1 | That | 3 | 11 | he | 1 |
| 2 | Tom | 3 | 12 | huge | 1 |
| 3 | a | 2 | 13 | is | 1 |
| 4 | animal | 2 | 14 | knew | 1 |
| 5 | giant | 2 | 15 | looked | 1 |
| 6 | I | 2 | 16 | panda | 1 |
| 7 | was | 2 | 17 | said | 1 |
| 8 | bear | 1 | 18 | the | 1 |
| 9 | But | 1 | 19 | What | 1 |
| 10 | called | 1 | | | |

FIG. 63

| WORDS AND PHRASES NO. | WORDS AND PHRASES | FREQUENCY OF USE (NUMBER OF OCCURRENCES) | WORDS AND PHRASES NO. | WORDS AND PHRASES | FREQUENCY OF USE (NUMBER OF OCCURRENCES) |
|---|---|---|---|---|---|
| 1 | a | 3 | 11 | he | 1 |
| 2 | giant | 3 | 12 | huge | 1 |
| 3 | That | 3 | 13 | is | 1 |
| 4 | animal | 2 | 14 | knew | 1 |
| 5 | I | 2 | 15 | like | 1 |
| 6 | panda | 2 | 16 | looked | 1 |
| 7 | was | 2 | 17 | said | 1 |
| 8 | bear | 1 | 18 | the | 1 |
| 9 | But | 1 | 19 | What | 1 |
| 10 | called | 1 | | | |

DOCUMENT PROCESSING APPARATUS USING A SYNONYM DICTIONARY

This application is a continuation of application Ser. No. 08/080,625, filed Jun. 24, 1993, now abandoned.

BACKGROUND OF THE INVENTION

1. Field of the Invention

The present invention relates to a document processing apparatus capable of creating a document having rich expressions by referring to a synonym dictionary in order to substitute the words which have other expressions for the words in the document.

2. Related Background Art

In order that a frequent repetition of a same word may be avoided in producing a document, it has hitherto been in practice that a user refers to a synonym dictionary for searching any synonyms of such a word and selects the appropriate one, if any, from those retrieved candidates for the intended substitution.

However, according to a method of the kind, there is a possibility that the selected word is the one which has already been used repeatedly. In such a case, the objective to avoid the frequent repetition of the same word can hardly be attained.

Also, it is a time-consuming work for a user to find the words which are frequently used repeatedly and its locations if the user himself tries to accomplish such a work.

Also, when the words constitute an idiom, that is, an idiom "make out" or "make over" is in a document, for example, it is meaningless to attempt substituting some other word for only the word "make".

Also, it is meaningless to judge whether or not a substitution should be made regarding a proper noun, special terms, and the like for which any other word or words cannot be substituted.

Also, even when a word is substituted in the middle of a documentation, the frequency of use will increase if such a substituted word is used again, necessitating another substitution. Also, when a particular word must be removed exactly from a document, not necessarily limited to the degree of its frequent use, the substitution should be made, yet there is a possibility that the same word which has been removed will be used again, making it necessary to repeat the substitution.

Also, when one document is produced by a plurality of users, a word for which one user has selected a substitution due to its unfitness may be used by some other user or users.

SUMMARY OF THE INVENTION

Therefore, it is an object of the present invention to eliminate the above-mentioned drawbacks, and provide a document processing apparatus capable of excluding any word which has been repeatedly used from the substitutional candidates among the synonyms retrieved when a synonym dictionary is searched for the purpose of substituting a synonym for a word.

It is another object of the present invention to provide a document processing apparatus capable of giving a priority to a word having a lower frequency of use among the synonyms retrieved when a synonym dictionary is searched for the purpose of substituting a synonym for a word.

It is still another object of the present invention to provide a document processing apparatus capable of examining the frequency of use for the words as an idiom (a phrase), not as a word itself, when a plurality of words constitute an idiom.

It is a further object of the present invention to provide a document processing apparatus capable of excluding the words which are not substitutable for any other word from the objective words the intended substitution of which should be judged.

It is still a further object of the present invention to provide a document processing apparatus capable of detecting the word which has been an object of a substitution at the time of its input in the subsequent processing.

According to one aspect, the present invention which achieves these objectives relates to a document processing apparatus comprising:

document memory means for storing a document;

a dictionary for storing the synonyms for a word;

designating means for designating a desired word in the document stored in the aforesaid document memory means;

retrieving means for retrieving the synonyms of the word designated by the aforesaid designating means in accordance with the aforesaid dictionary;

substitutional candidate memory means for storing the retrieved synonyms;

calculating means for calculating the number of uses in the document stored in the aforesaid document memory means with respect to each of the synonyms stored in the aforesaid substitutional candidate memory means;

processing means for processing the stored contents in the aforesaid substitutional candidate memory means on the basis of the calculated value of the aforesaid calculating means;

substitutional candidate displaying means for displaying the processed results of the aforesaid processing means;

selecting means for selecting one candidate from the substitutional candidates displayed by the aforesaid substitutional candidate displaying means; and substituting means for substituting the selected candidate by the aforesaid selecting means for the word designated by the aforesaid designating means.

According to another aspect, the present invention which achieves these objectives relates to a document processing apparatus comprising:

document memory means for storing a document;

a dictionary for storing the synonyms for a word;

designating means for designating a desired word in the document stored in the aforesaid document memory means;

dictionary retrieving means for retrieving the synonyms of the word designated by the aforesaid designating means in accordance with the aforesaid dictionary;

selecting means for selecting one synonym from the retrieved synonyms;

document retrieving means for retrieving sentences including the synonym selected by the aforesaid selecting means from the sentence stored in the aforesaid document memory means; and displaying means for discriminately displaying the sentences retrieved by the aforesaid document retrieving means.

According to another aspect, the present invention which achieves these objectives relates to a document processing apparatus comprising:

document memory means for storing a document;

a dictionary for storing the synonyms for a word;

designating means for designating a desired word in the document stored in the aforesaid document memory means;

retrieving means for retrieving the synonyms of the word designated by the aforesaid designating means in accordance with the aforesaid dictionary;

substitutional candidate displaying means for displaying the retrieved synonyms;

selecting means for selecting one candidate from the substitutional candidates displayed by the aforesaid substitutional candidate displaying means;

substituting means for substituting the selected candidate by the aforesaid selecting means for the word designated by the aforesaid designating means;

word memory means for storing the word designated by the aforesaid designated means and for which a substitution is made by the aforesaid substituting means;

inputting means for inputting a word;

judging means for judging whether or not the word inputted by the aforesaid inputting means is stored in the aforesaid word memory means; and warning means for issuing a warning when the aforesaid judging means judges that the word is stored.

According to another aspect, the present invention which achieves these objectives relates to a document processing apparatus comprising:

document memory means for storing a document;

a dictionary for storing the synonyms for a word;

designating means for designating a desired word in the document stored in the aforesaid document memory means;

retrieving means for retrieving the synonyms of the word designated by the aforesaid designating means in accordance with the aforesaid dictionary;

substitutional candidate displaying memos for displaying the retrieved synonyms;

selecting means for selecting one candidate from the substitutional candidates displayed by the aforesaid substitutional candidate displaying means;

first substituting means for substituting the selected candidate by the aforesaid selecting means for the word designated by the aforesaid designating means;

word memory means for storing the word for which a substitution is made by the aforesaid substituting means corresponding to the result of its substitution;

inputting means for inputting a word;

judging means for judging whether or not the word inputted by the aforesaid inputting means is stored in the aforesaid word memory means as a substituted word; and second substituting means for substituting the result of the substitution stored corresponding to the aforesaid substituted word for the aforesaid inputted word when the aforesaid judging means judges that the word is stored.

According to another aspect, the present invention which achieves these objectives relates to a document processing apparatus comprising:

document memory means for storing a document;

a dictionary for storing the synonyms for a word;

judging means for judging whether each of the words is a part of an idiom or not in a document stored in the aforesaid document storing means; and calculating means for calculating the number of use of each word and an idiom in the document stored in the aforesaid document storing means as an idiom when such words are judged by aforesaid judging means as being a part of an idiom or as a word when such word is judged by the aforesaid judging means as being not any part of an idiom.

According to another aspect, the present invention which achieves these objectives relates to a document processing apparatus comprising:

document memory means for storing a document;

a dictionary for storing the synonyms for a word;

calculating means for calculating the number of use in a document with respect to each of the words in the document stored in the aforesaid document memory means;

memory means for storing the result of the calculation of each word by the aforesaid calculating means;

judging means for judging whether or not each of the words in the document stored in the aforesaid document memory means is stored or not in the aforesaid dictionary; and controlling means for removing from the aforesaid memory means the words which are judged by the aforesaid judging means as being not stored.

According to another aspect, the present invention which achieves these objectives relates to a document processing apparatus comprising:

document memory means for storing a document;

a synonym dictionary for storing the synonyms for a word;

a user's dictionary for storing the words which the user has registered;

calculating means for calculating the number of use in a document with respect to each of the words in the document stored in the aforesaid document memory means;

memory means for storing the result of calculation of each word by the aforesaid calculating means;

judging means for judging whether or not each of the words in the documents stored by the aforesaid document memory means is stored in the aforesaid user's dictionary; and controlling means for removing from the aforesaid memory means the words which are judged by the aforesaid judging means as being not stored.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a view showing an example in which the candidates of synonymous words and phrases are listed.

FIG. 6 is a view illustrating the frequency of use of each of the candidate words and phrases.

FIG. 7 is a view showing an example in which the processed candidate words and phrases are listed.

FIG. 8 is a flowchart showing the synonym retrieving steps according to a second embodiment.

FIG. 9 is a view showing the frequency of use of the head and candidate words and phrases.

FIG. 10 is a view showing a list of the processed candidate words and phrases.

FIG. 11 is a block diagram showing the structure of a control unit in detail.

FIG. 13 is a view showing an example of a document produced.

FIG. 14 is a view showing the structure of a data base for a synonym dictionary.

FIG. 15 is a view showing an example in which the synonymous candidate words and phrases are listed.

FIG. 16 is a view showing an example of display for confirming the example in which the substitutional words and phrases are used.

FIG. 17 is a view showing the example in which a document after the substitution processing is displayed.

FIG. 18 is a view showing an example of display for confirming the example in which the substitutional words and phrases are used.

FIG. 22 is a view showing an example of a document produced.

FIG. 23 is a view showing an example of a memory for the inputted words and phrases.

FIG. 24 is a view showing an example of a document in the process of input.

FIG. 25 is a view showing an example of a document produced.

FIG. 27 is a view showing an example of a document produced.

FIG. 28 is a view showing an example of the memory of substitutional words and phrases.

FIG. 29 is a view showing an example of a document in the process of input.

FIG. 30 is a view showing an example of a document produced.

FIG. 33 is a view showing an example of a document produced.

FIG. 34 is a view showing the example in which the frequency of use of the words is listed.

FIG. 35 is a view showing the example in which the frequency of use of the words and idioms are listed.

FIG. 38 is a view showing an example of a document produced.

FIG. 39 is a view showing the example in which the frequency of use of the words is listed.

FIG. 40 is a view showing the example in which the frequency of use of the words and phrases is listed.

FIG. 44 is a view showing the example in which the frequency of use of the words is listed.

FIG. 45 is a view showing the example in which the frequency of use of the words is listed after having removed the words which are not contained in a synonym dictionary.

FIG. 48 is a view showing the structure of a memory for a list of frequency of use.

FIG. 49 is a view showing an example of a document produced.

FIG. 50 is a view showing the example in which the frequency of use is listed.

FIG. 51 is a view showing an example of a document for which the word counting steps have been taken.

FIG. 52 is a view showing the example in which the frequency of use is listed.

FIG. 53 is a view showing the example in which the frequency of use of the words is listed after having removed the words which are not contained in a synonym dictionary.

FIG. 56 is a view showing the example in which the frequency of use is listed.

FIG. 57 is a view showing an example of the contents of a user's dictionary.

FIG. 58 is a view showing the example in which the frequency of use is listed.

FIG. 59 is a view showing the structure of a memory for the list of the frequency of use.

FIG. 60 is a view showing the example in which the frequency of use is listed.

FIG. 61 is a view showing an example of a document for which the word counting steps have been taken.

FIG. 62 is a view showing the example in which the frequency of use is listed.

FIG. 63 is a view showing the example in which the frequency of use of the words is listed after having removed the words which are not contained in a user's dictionary.

DETAILED DESCRIPTION OF THE PREFERRED EMBODIMENTS

Hereinafter, with reference to the accompanying drawings the description will be made of the embodiments according to the present invention.

[Embodiment 1]

Figure 1:
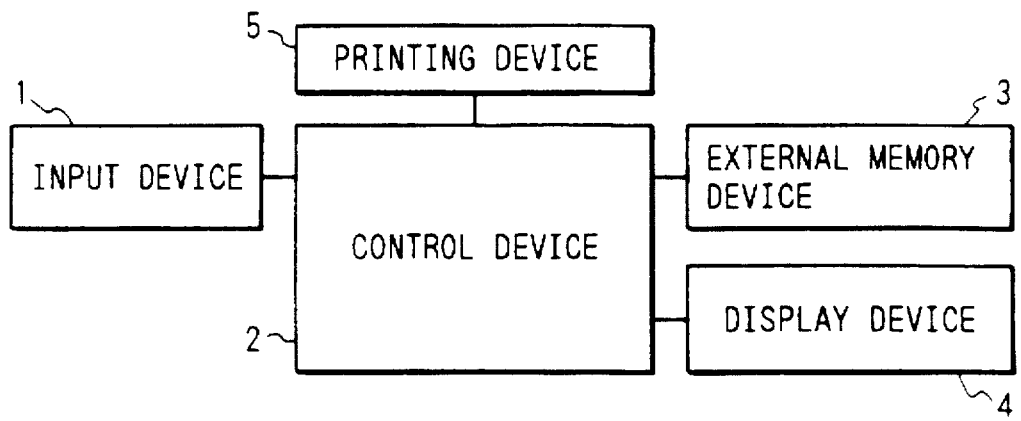
FIG. 1 is a block diagram showing the structure of an electronic typewriter to which the present invention is applicable.

FIG. 1 is a block diagram showing an electronic typewriter to which the present invention is applicable.

A reference numeral 1 designates a keyboard, mouse, and other input device; 2, a control device which comprehensively control the entire systems; 3, an external memory device such as magnetic disk, memory card, ROM, or the like which stores various information; 4, a CRT, liquid crystal display, plasma display, or other display device; and 5, a thermo-sensitive printer, laser beam printer, ink jet printer, or other printing device.

The display device 4 displays a document, image or document setting screen consisting of a plurality of items, or other image representation by means of the control of the control device 2. The printing device 5 outputs a produced document, image, or the like for printing onto a sheet in accordance with a format which has been set. The external memory device 3 holds the inputted or edited documents, images, and the like in a storage or reads the documents, images, and the like thus stored from the storage. The input device 1 inputs the inputted information required for processing a document and the like to the control device 2. The above-mentioned structure shown in FIG. 1 is the same in each of the embodiments given below.

Figure 2:
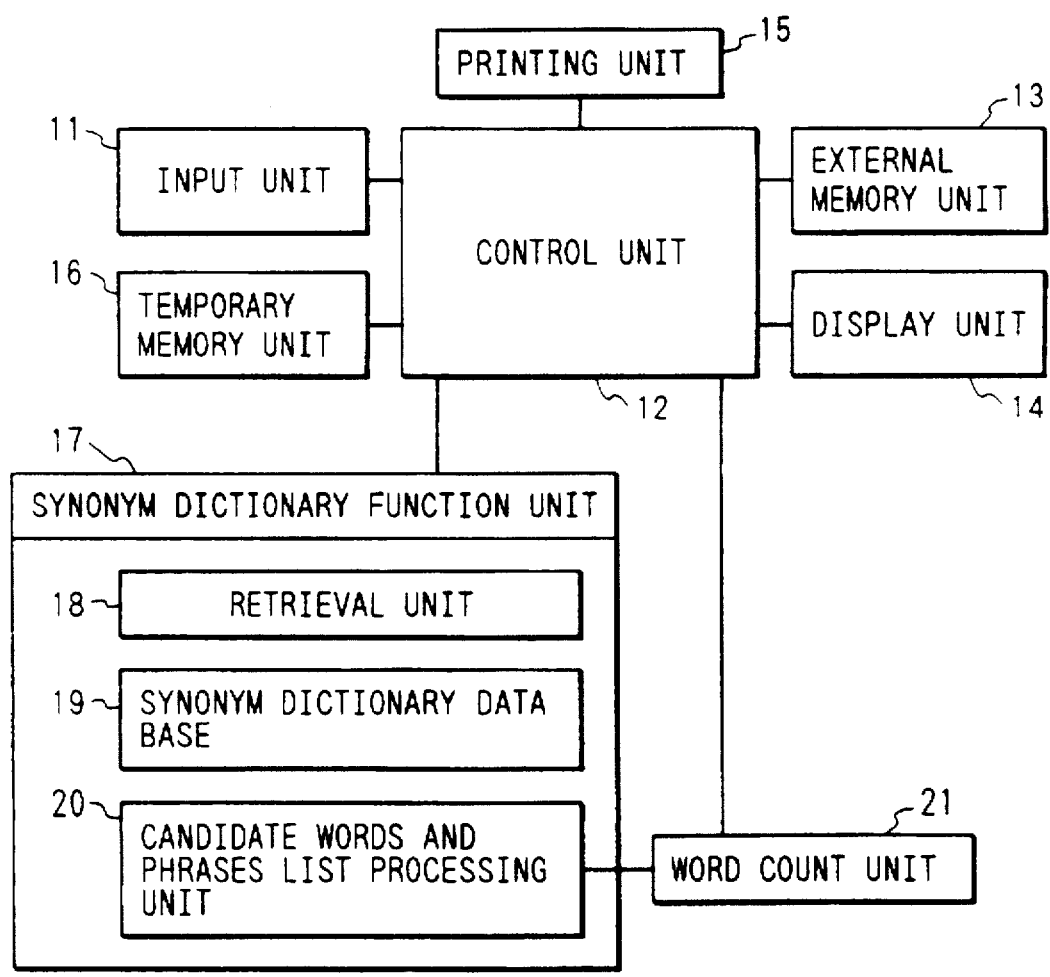
FIG. 2 is a block diagram showing the structure of a control device in detail.

FIG. 2 is a block diagram showing a structural example of the control device 2.

An input unit 11 is controlled by a control unit 12 to read a document or other data inputted by the input device 1 and store them in a temporary memory unit 16 as required. A display unit 14 is controlled by the control unit 12 to read the required data from the temporary memory unit 16 and display them on the screen of the display device 4. A printing unit 15 is controlled by the control unit 12 to read the required data from the temporary memory unit 16 to output them to the printing device 5. An external memory unit 13 is controlled by the control unit 12 to exchange a text data and a control program for the control device 2 between the external memory device 3 and the temporary memory unit 16 as required.

A synonym dictionary function unit 17 is controlled by the control unit 12 to search a synonym dictionary data base 19 by a retrieving unit 18 using given head words or phrases; thus producing a list of synonymous candidate words and phrases through a processing unit 20 for the candidate word and phrase list and exchanging data with the temporary memory unit as required. A word count function unit 21 is controlled by the control unit 12 to calculate the frequency of use of each of the word (and the head words and phrases . . . Embodiment 2) retrieved by the retrieving unit 18 from the candidate word and phrase list; thus transferring the result of the calculation to a processing unit 20 for the candidate word and phrase list.

Hereinafter, with reference to a process flowchart shown in FIG. 3, the operation of the synonym dictionary function unit 17 will be described in detail.

When actuated, the synonym dictionary function unit 17 searches the synonym dictionary data base 19 using the head words or phrases provided by the retrieving unit 18 in step S31 in order to produce a list of the synonymous candidate word and phrase. Then, proceeding to step S32, the process is executed by the word count function unit 21 to calculate the frequency of use of all the words and phrases in the candidate word and phrase list used for a document. In continuation, proceeding to step S33, the process will be executed by the processing unit 20 for candidate word and phrase list to rearrange the words and phrases in the candidate word and phrase list in accordance with the foregoing frequency of use.

Now, in conjunction with FIG. 4 to FIG. 7, a specific example of the above-mentioned steps will be described.

Figures 3, 4:
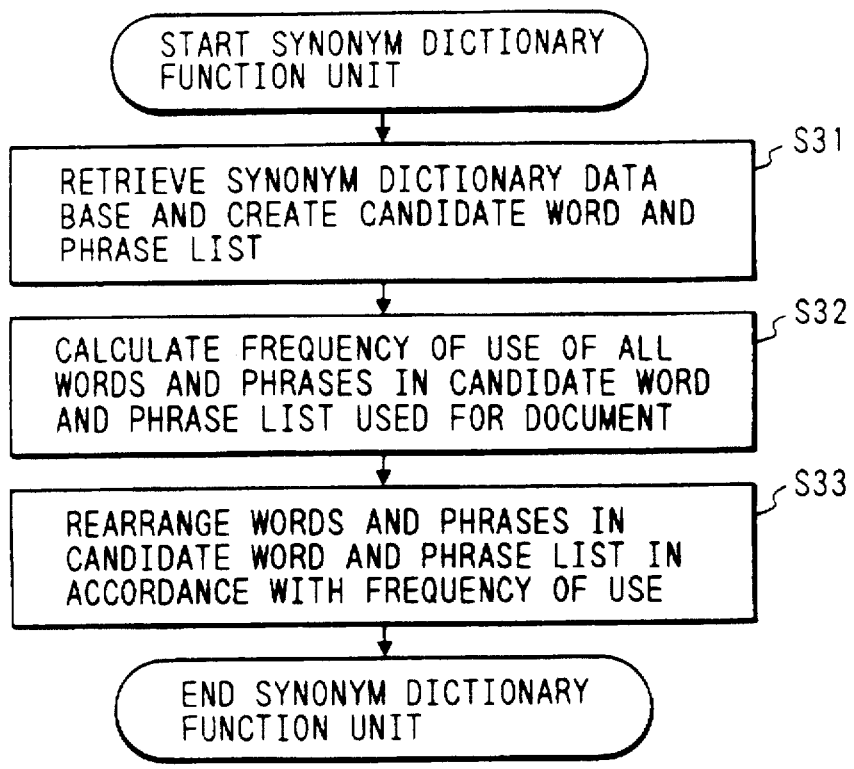
FIG. 3 is a flowchart showing a synonym retrieving steps according to a first embodiment.
FIG. 4 is a view showing an example of a document produced.

FIG. 4 is an example of a document produced by a user. Here, it is assumed that an underlined word "huge" is designated, and that the synonym dictionary function unit 17 is actuated with this word as the head words and phrases. It is also assumed that the designation of a word is executed by picking up such a word including letters on the cursor with a space as a pause, for example.

At first, a synonymous candidate word and phrase list is produced in step S31. The result obtained is such as shown in FIG. 5. Then, proceeding to step S32, the process will be executed to calculate the frequency of use regarding each of candidate words and phrases in the document shown in FIG. 4. The result is such as shown in FIG. 6. Further in step S33, the candidate words and phrases in the candidate word and phrase list are rearranged in order of the lower frequency in accordance with the foregoing frequency of use. Hence, a list of the synonymous candidate word and phrase can be obtained as shown in FIG. 7.

As described above, according to the apparatus of the present embodiment, it is possible to provide candidate words and phrases in order of those more suitable than the substitutes for the head words and phrases. In this way, the advantages of the synonym dictionary function can be more effectively utilized.

[Embodiment 2]

With reference to a flowchart shown in FIG. 8, the detailed description will be made of the operation of the synonym dictionary function unit 17 according to a second embodiment.

When actuated, the synonym dictionary function unit 17 searches the synonym dictionary data base 19 by the retrieving unit 18 as in the step S81 using given head words and phrases in order to produce a list of synonymous candidate words and phrases. Then, proceeding to step S82, the process is executed by the word count function unit 21 to calculate the frequency of use of all the words and phrases in the candidate word and phrase list used for a document. In continuation, proceeding to step S83, the process will be executed by the processing unit 20 for candidate word and phrase list to remove from the list the candidate word and phrase which have a higher frequency of use than that of the head words and phrases.

Now, in conjunction with FIGS. 4 and 5, and FIGS. 9 and 10, a specific example of the above-mentioned steps will be described.

A document which is produced by a user is the same one as in the Embodiment 1 shown in FIG. 4. It is assumed that the underlined word "huge" is picked up and made as the head words and phrases to actuate the synonym dictionary function unit. At first, in step S81, a list of synonymous candidate words and phrases is produced. Thus, the result obtained is such as shown in FIG. 17 as in the case of the Embodiment 1.

Then, proceeding to step S82, the process is executed to calculate the frequency of use of the foregoing head words and phrases and each of the candidate word and phrase in the document. The result is such as shown in FIG. 9. Further, in step S83, the candidate words and phrases which have a higher frequency of use than that of the head words and phrases are removed from the list. Of the candidate words and phrases shown in FIG. 5, the frequency of use of the word "giant" is higher than that of the head word "huge", the word "giant" will be removed from the list. Hence, a list of the synonymous candidate words and phrases is obtained as shown in FIG. 10.

As described above, according to an apparatus of the present embodiment, it is possible to eliminate the candidate words and phrases which are not needed eventually in advance in executing the intended substitution for the head words and phrases; thus implementing the provision of a list in which only the effective candidate words and phrases are stated. In this way, the synonym dictionary function unit can be utilized more efficiently.

As set forth above, among the candidate words and phrases, those having the higher frequency of use than that of the head words and phrases are removed. However, when the head words and phrases are substituted by any of the candidate words and phrases, the frequency of use of the head words and phrases is decreased by one while the frequency of use of the candidate words and phrases is increased by one. Therefore, if the head words and phrases are substituted by the candidate words and phrases the frequency of use of which is less by one, the frequency of use will be inverted. As a result, the frequency of use of the substituted candidate words and phrases is caused to reach the frequency of use of the head words and phrases before the substitution. Therefore, it may be possible to remove the candidate words and phrases the frequency of use of which is higher than that of the head words and phrases by (the frequency of use −1)or more.

Also, it may be possible to arrange that the upper limit of the frequency of use is defined in one document and the candidate words and phrases above this limit are removed.

Furthermore, it may be possible to arrange both the removal of the candidates having a higher frequency of use and the rearrangement of the candidate in order of the lower frequency.

Also, in the above-mentioned embodiments, the frequency of use of the candidate words and phrases or the head words and phrases is counted, but it may be possible to count the frequency of use of all the words and phrases in a document prior to executing a substitution, so that the result of such counting is simply referred to with respect of the required words and phrases in executing a substitution. Moreover, it may be possible to actuate a substitution process for the words and phrases having a higher frequency of use on the basis of the counting of the frequency of use executed prior to the substitution. In such a case, as the substitution process proceeds, the frequency of use may be increased or decreased.

[Embodiment 3]

In the present embodiment, it is arranged for a user to recognize the meaning of the substitutional candidate words and phrases by underlining the other related parts in a document for the purpose.

FIG. 11 is a block diagram showing the structure of the control device 2 according to a third embodiment.

In FIG. 11, the descriptions of the input unit 11 to the temporary memory unit 16 are the same as those in FIG. 2.

A synonym dictionary function unit 117 is controlled by the control unit 12, and a head word and phrase input unit 119, dictionary retrieving unit 120, substitutional word and phrase selecting unit 22, searching unit 23 for words and phrases in a document, confirming unit 24, substitution unit 25 and candidate output unit 26 are controlled by a dictionary control unit 118.

The head word and phrase input unit 119 provides the dictionary control unit 118 with the head word and phrase required for searching the synonym dictionary data base 121.

The dictionary retrieving unit 120 searches the synonym dictionary data base 121 using the head word and phrases provided by the dictionary control unit 118 to provide the dictionary control unit 118 with a list of substitutional words and phrases.

The substitution unit 122 provides a user with a list of the substitutional words and phrases provided by the dictionary control unit 118, and substitutes the word and phrase selected by the user for the head word and phrase.

The searching unit 123 searches a designated document for the word and phrase provided by the dictionary control unit 118 to supply the result to the dictionary control unit 118.

The confirming unit 124 underlines the corresponding words and phrases in the document for display on the basis of the information given by the dictionary control unit 118.

The output unit 126 outputs the result provided by the dictionary control unit 118 to the control unit 12.

Hereinafter, with reference to a process flowchart shown in FIG. 12, the detailed description will be made of the synonym dictionary function unit 117. These processes are controlled by the control unit 12.

When actuated, the synonym dictionary function unit 117 acquires the head word and phrase required for searching the synonym dictionary data base 121 by means of the head word and phrase input unit 119 in step S121.

In step S122, the dictionary retrieving unit 120 searches the synonym dictionary data base 121 using the foregoing head word and phrase to produce a list of substitutional candidate words and phrases.

In step S123, the substitution unit 122 provides the user with the list of the substitutional candidate words and phrases. Here, the user selects substitutional words and phrases arbitrarily. If no selection is made, the operation in the synonym dictionary function unit 117 will be terminated.

If any substitutional word and phrase are selected, the process will proceed from step S124 to step S125 where the searching unit 123 searches the foregoing word and phrase in the designated document. Here, if the same word and phrase as the foregoing substitutional word and phrase are not detected at all, the process will jump to step S129.

If the same word and phrase are detected, the process will proceed to step S127 where the confirming unit 124 underlines the corresponding word and phrase for display on the basis of the information obtained in the step S125. In step S128, the user is requested to confirm whether the substitution is accepted or not. If the user does not accept it, the process will return to the step S123.

If the substitution is accepted by the user, the process will proceed to step S129 where the substitution unit 122 substitutes the word and phrase selected in the step S123 for the word and phrase designated in the step S121.

In step S130, the output unit 126 outputs the text information modified in the above-mentioned processes to the control unit 12; thus terminating the processes in the synonym dictionary function unit 17.

Now, in conjunction with FIGS. 13 to 17, the above-mentioned processes will be described.

FIG. 13 illustrates a sentence inputted by a user.

When the synonym dictionary function unit 17 is actuated, the head words and phrases are requested in the step S121 for the head word and phrase input unit 119 to search the synonym dictionary data base 21. Here, it is assumed that an underlined word "produce" is inputted as shown in FIG. 13.

FIG. 14 illustrates the contents of the synonym dictionary data base 21 employed for the present embodiment. These contents are the same in the other embodiments set forth below.

In the step S122, using the word "produce", the dictionary retrieving unit 120 searches the synonym dictionary data base 21 to produce in the step S123 a list of substitutional words and phrases as shown in FIG. 15. Here, the use selects the substitutional word and phrase arbitrarily. If not selected, the operation in the synonym dictionary function unit 17 is terminated. Here, however, assuming that a word "make" is selected, the description will continue.

As the result of this selection, the process will proceed from the step S124 to the step S125 where the searching unit 123 searches the word "make" in the designated document. Then, if no "make" is found at all in the sentences in that document, the process will jump to the step S129. However, according to the example shown in FIG. 13, the word is detected. Thus, the process will proceed to the step S127 where the confirming unit 124 underlines the corresponding words in the sentences for display in accordance with the information obtained in the step S125. FIG. 16 illustrates an example of the kind.

The user is requested in the step S128 to confirm whether the substitution is approved or not. If approved by the user, the process will proceed to the step S129 where the substitution unit 122 substitutes the word "make" for the word "produce". Here, it is assumed that there has already been the word "make" having the same usage as the word "make" for the intended substitution in the sentence in this example. Therefore, the user does not approve the proposed substitution. The process will return to the step S123 accordingly.

In the step S123, the user is assumed to have selected another substitutional candidate word "create". The process will proceed from the step S124 to the step S125 where the searching unit 123 searches the word "create" in the designated document. Here, the same word as "create" is detected. The process will jump from the step S126 to the step S129 where the substitution unit 122 substitutes the word "create" for the word "produce". FIG. 17 illustrates a sentence which is made after the user has executed the substitution as above.

In the step S130, the output unit 126 outputs to the control unit 12 the sentence information thus modified by the above-mentioned steps. Hence, the operation in the synonym dictionary function unit 17 is terminated.

As described above, the apparatus according to the present embodiment enables the user to easily know the usage of the substitutional word and phrase selected from the list of the substitutional candidate words and phrases supplied by the synonym dictionary function unit if the substitutional word and phrase thus selected have already been used in the designated sentence.

[Embodiment 4]

In the above-mentioned embodiment 3, the corresponding words and phrases are underlined for confirmation, but in the present embodiment, the sentence which contains such corresponding words and phrases is picked up for display and confirmation.

Figure 12:
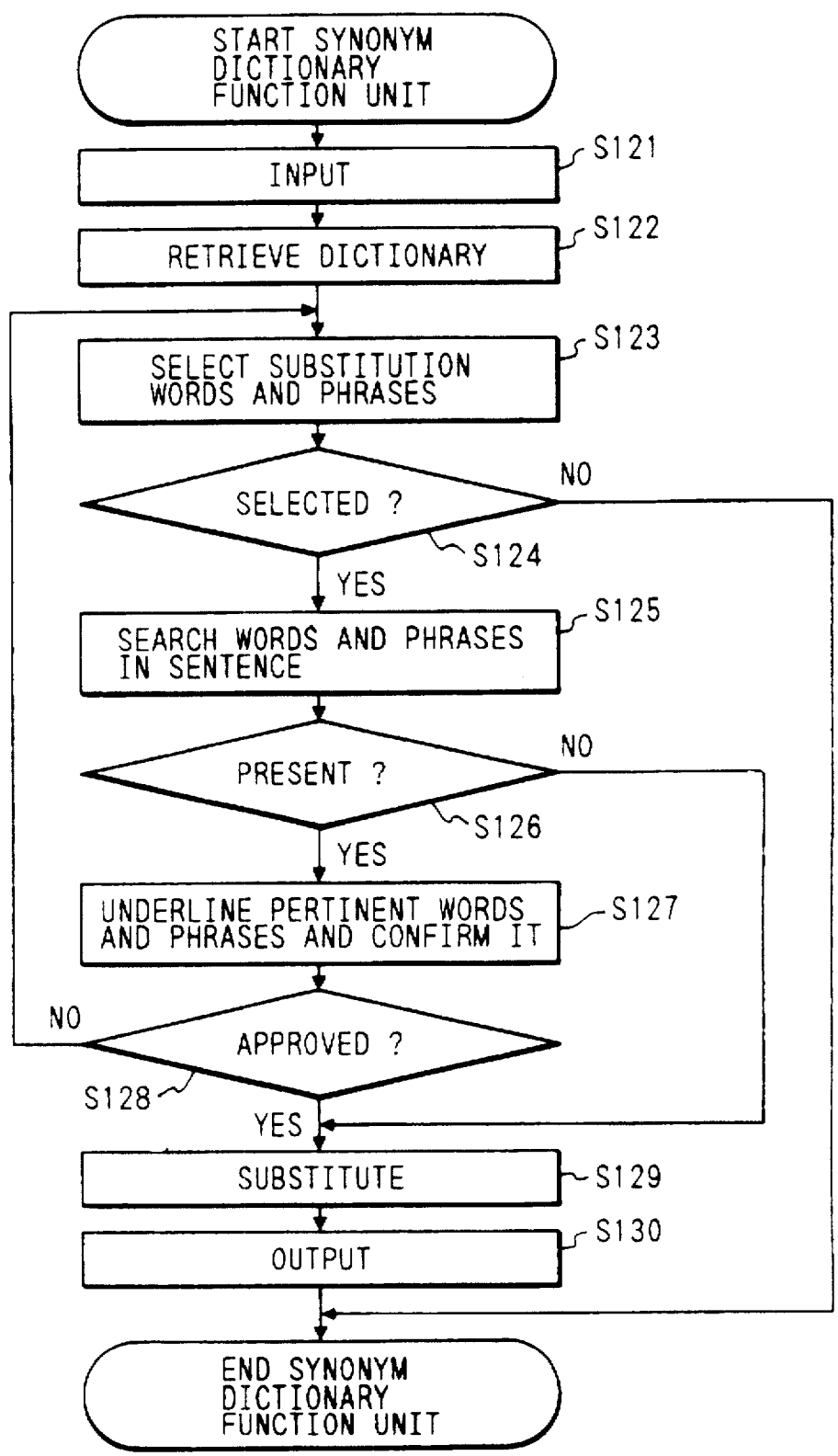
FIG. 12 is a flowchart showing the synonym retrieving steps according to a third embodiment.

In other words, in a flowchart shown in FIG. 12, the confirming unit 124 extracts, instead of the step S127, the sentence containing the corresponding words and phrases from the designated document and displays them as shown in FIG. 18. In the other aspects, the present embodiment is the same as the Embodiment 3.

[Embodiment 5]

Figure 19:
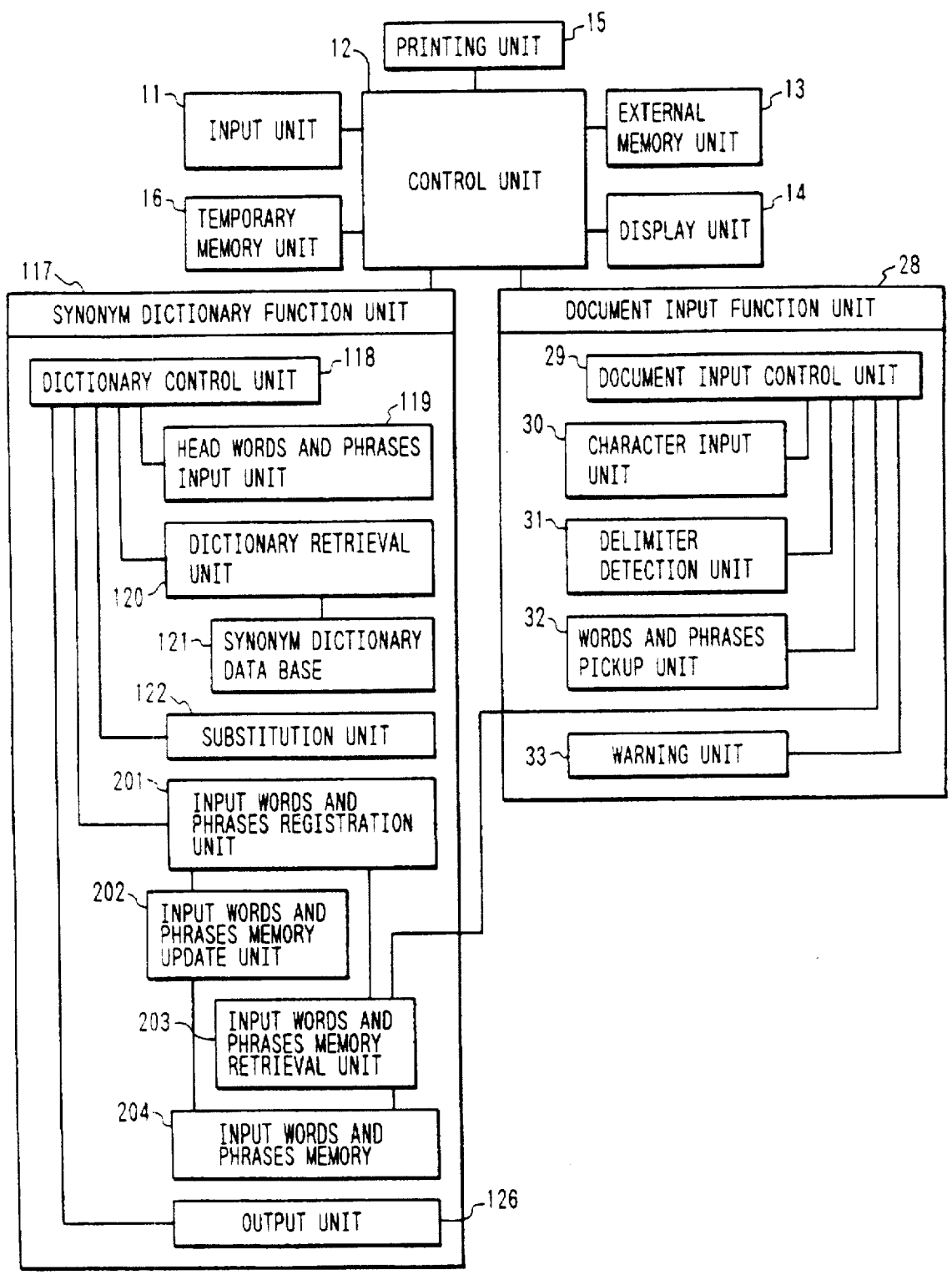
FIG. 19 is a block diagram showing the structure of a control unit in detail.

FIG. 19 is a detailed block diagram showing the structure of the control device 2 according to the present embodiment. In FIG. 19, the descriptions from the input unit 11 to the temporary memory unit 16 are the same as those shown in FIG. 2. In the synonym dictionary function unit 117, the dictionary control unit 118 controls each of the unit in the same manner as shown in FIG. 11. The structures of the head word input unit 119 to the substitution unit 122 and the output unit 126 are the same as those shown in FIG. 11. Therefore, the descriptions thereof will be omitted.

Using an input word and phrase memory retrieving unit 203, an input word and phrase register 201 judges whether the inputted word and phrase provided by the dictionary control device 118 are registered in an input word and phrase memory 204 or not. If not registered as yet, the inputted word and phrase thus provided will be registered in the input word and phrase memory 204 by means of an updating unit 202 for the input word and phrase memory.

A document input function unit 28 is controlled by the control unit 12. A letter input unit 30, delimiter detecting unit 31, word and phrase pick up unit 32, input word and phrase memory retrieving unit 203, and warning unit 33 are controlled by a document input control unit 29; thus inputting a document.

The letter input unit 30 provides the document input control unit 29 with the letters inputted by a user.

The delimiter detecting unit 31 detects whether the letters provided by the document input control unit 29 serve as a punctuation of the word and phrase, that is, a delimiter or not. In the present embodiment, a space is established as the delimiter.

The word and phrase pick up unit 32 picks up the words and phrases present in a position designated by the document input control unit 29 and supply them to the document input control unit 29.

The warning unit 33 is controlled by the document input control unit 29 to beep and call the user's attention.

Hereinafter, with reference to a process flowchart shown in FIG. 20, the synonym dictionary function unit 17 will be described in detail.

When actuated in step S201, the synonym dictionary function unit 17 acquires by means of the head work and phrase input unit 119 the head word and phrase required for searching the synonym dictionary data base 121.

Then, in step S202, the process is executed to search the synonym dictionary data base 121 using the foregoing head word and phrase by means of the dictionary retrieving unit 120 and produce a list of substitutional words and phrases.

Further, proceeding to step S203, the process will be executed to provide a user with the foregoing list of substitutional words and phrases by means of the substitution unit 122. If any selection is made by the user, the word and phrase inputted by the head word and phrase input unit 119 is substituted by the selected substitutional word and phrase.

In step S204, whether or not any substitution is executed in the step S203 is judged. If not executed, the operation in the synonym dictionary function unit 17 will be terminated.

If a substitution is executed, the process will proceed to step S205 where the foregoing word and phrase is searched in the input word and phrase memory unit 204 using the input word and phrase memory retrieving unit 125 in order to judge whether such word and phrase are present in the memory unit 204 or not. If present, the process will proceed from step S206 to step S207. Then, the result is output from the output unit 127 to the control unit 12, thus terminating the process in the synonym dictionary function unit 17.

In the step S206, if the judgment is negative, the process will proceed to step S208 where the inputted word and phrase is registered in the input word and phrase memory 126 by means of the input word and phrase memory updating unit 202. Thus, the process will proceed to step S207.

Figure 21:
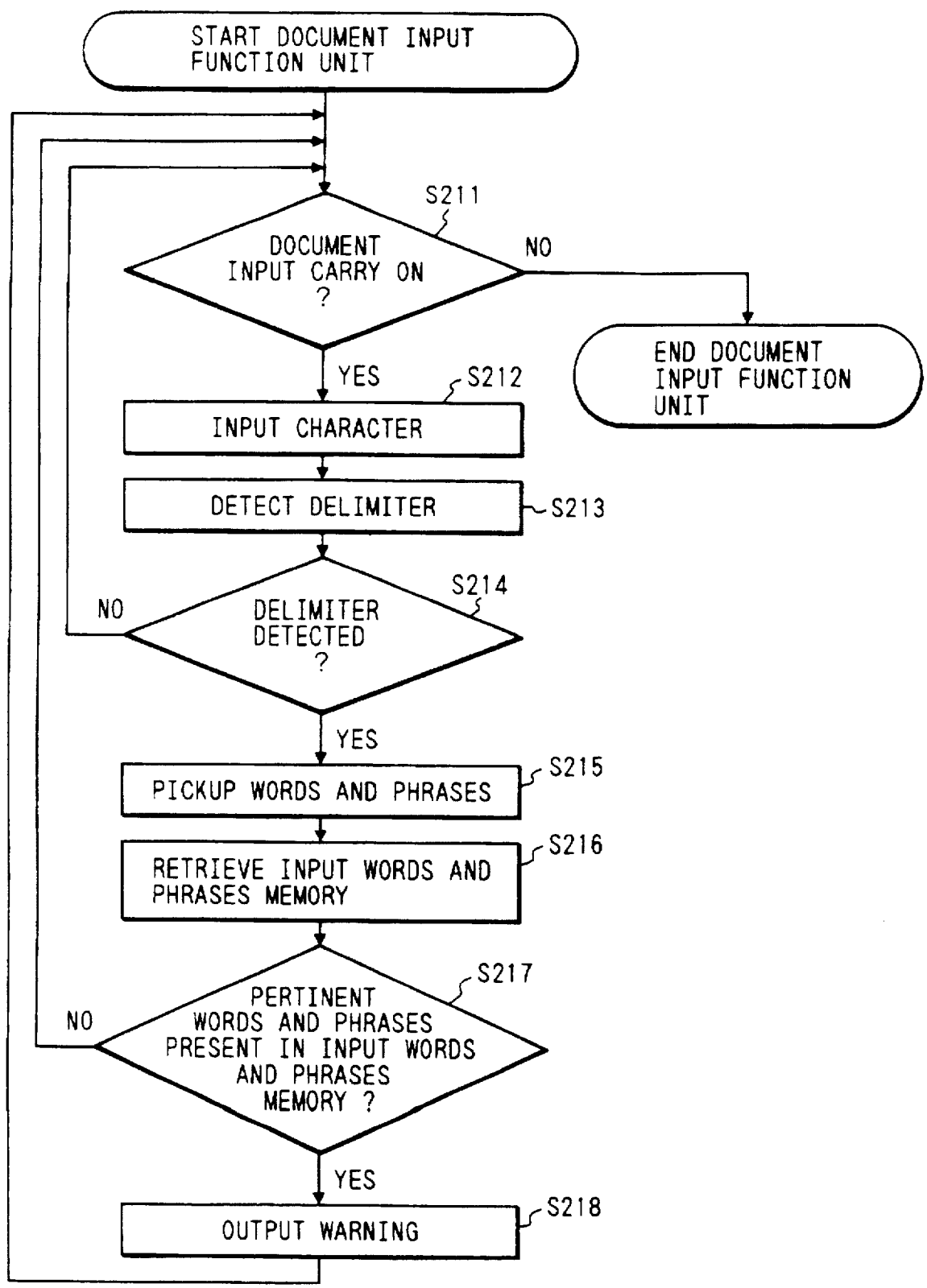
FIG. 21 is a flowchart showing the document inputting steps according to the fifth embodiment.

Hereinafter, with reference to a flowchart shown in FIG. 21, the document input function unit 128 will be described in detail.

When actuated in step S211, the document input function unit 128 judges whether the document input will continue or not depending on the result of the step S211. If not continued, the operation in the document input function unit 128 will be terminated.

If continued, the process will proceed to step S212 where the letters inputted by the user are acquired by means of the letter input unit 30 and stored in the document memory.

In step S213, whether the foregoing letters are a delimiter or not is judged by the delimiter detecting unit 31. If not, the process will return from the step S214 to the step S211.

If the letters are a delimiter, the process will proceed to step S215 where the word and phrase present in the position defined by the foregoing delimiter are picked up by the word and phrase pick up unit 32. Thus, in step S216, whether the foregoing word and phrase are present in the input word and phrase memory unit 204 or not is searched by the input word and phrase memory retrieving unit 203. If not present, the process will return from the step S217 to the step S211. If present, the process will proceed from the step S217 to step S218 where the warning sound is beeped by the warning unit 33. Then, the process will return to the step S211.

Now, in conjunction with FIG. 14 and FIGS. 22 to 25, the above-mentioned processes will be described.

Here, it is assumed that the contents of the synonym dictionary data base 121 are the same as those shown in FIG. 14. FIG. 22 illustrates a user's document in the process of production. The mark ▌ represents a cursor.

Now, it is assumed that the user actuates the synonym dictionary function unit 17 in order to obtain another expression after having inputted a word "giant" in the cursor position.

When actuated in step S201, the synonym dictionary function unit 17 acquires the head word "giant" required for searching the synonym dictionary data base 121 by means of the input unit 19.

In continuation, in step S202, the dictionary retrieving unit 120 searches the synonym dictionary data base 121 using the word "giant" to produce a list of candidate words and phrases.

Further, proceeding to step S203, the substitution unit 122 provides the user with the forgoing list of candidate words and phrases. Then, if the user selects any substitutional word, the word "giant" is substituted by such a substitutional word. Here, assuming that the user has selected a word "huge", the description will continue.

In step S204, whether the substitution is executed in the step S203 or not is judged. If not executed, the operation in the synonym dictionary function unit 17 will be terminated. Here, since the word "huge" has been selected, the judgment is affirmative.

Therefore, the process will proceed to step S205 where using the input word and phrase memory retrieving unit 203 whether the word "giant" is present in the input word and phrase memory unit 204 or not is detected. If present, the process will proceed to step S207. Here, however, the word is not present. Therefore, the process will proceed to step S208 where using the input word and phrase memory updating unit 202, the word "giant" is registered in the memory 126. Thus, the process will proceed to step S207 where the result is output from the output unit 126 to the control unit 12, hence terminating the process in the synonym dictionary function unit 17.

FIG. 23 illustrates an example of the contents of the input word and phrase memory unit 204 which are updated as described above. FIG. 24 illustrates the state that the user has written further on the document thereafter. While the user is inputting the document, the document input function unit 28 is always in operation. However, in the following description, the process will begin at the time when a space is written in the cursor position as shown in FIG. 24.

At this juncture, the process is in the step S211, but will proceed to step S212 because the document is continuously inputted. In the step S212, the word " " inputted by the user is acquired by means of the letter input unit 30 and stored in the document memory.

In step S213, whether the word " " is a delimiter or not is detected by the delimiter detecting unit 31. If not, the process will return from the step S214 to the step S211. If the word " " is a delimiter, the process will proceed to step S215 where the word "giant" present in the position defined by the foregoing delimiter is picked up by the word and phrase pick up unit 32, and in step S216, whether the word "giant" is present in the input word and phrase memory unit 204 or not is retrieved by the input word and phrase memory retrieving unit 203. If not present, the process will return from the step S217 to the step S211, but if present, the process will proceed from the step S217 to step S218 where the warning unit 33 beeps and calls the user's attention. Hence, the process will return to the step S211.

FIG. 25 illustrates the document which has been produced in this manner. The user has substituted the word "big" for the word "giant" against which the user is warned by a beep sound.

As described above, the apparatus according to the present embodiment enables the user to automatically detect the word or phrase which has once been the object of an intended substitution by the synonym dictionary function unit, that is, a case where the user inadvertently inputs again the word or phrase that the user himself has once regards as not a desirable substitute before. Also, when a plurality of users produce a document using a single document processing apparatus, it is possible for a latter user to avoid using the words or phrases that the former user has determined as not desirable substitute.

[Embodiment 6]

In the Embodiment 5, if a word once used for substitution is inputted, a warning is issued by the warning unit 33. In the present embodiment, however, a substitution unit 133 is provided instead of the warning unit 33 so that the same substitution can be made as previously executed.

Figure 26:
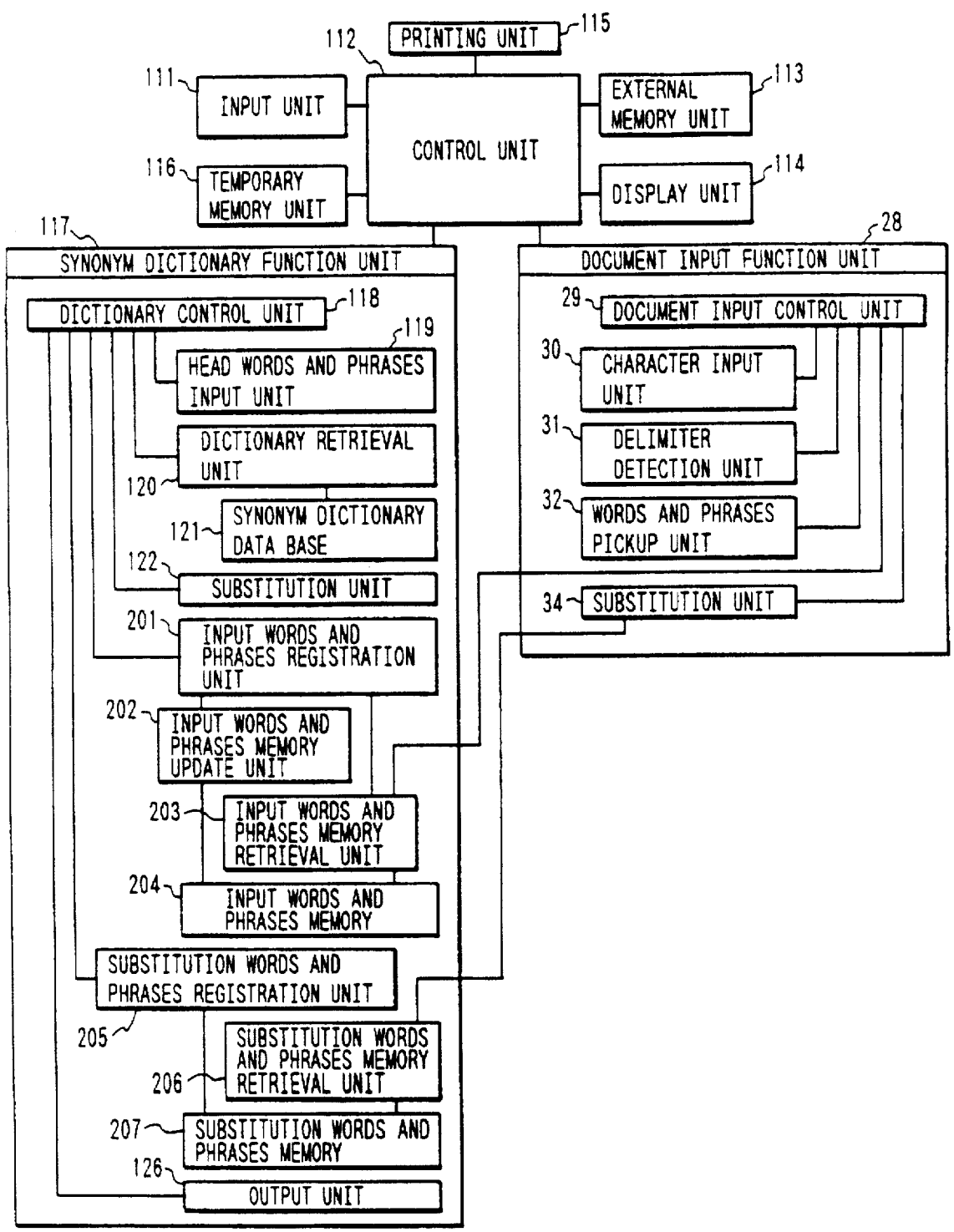
FIG. 26 is a block diagram showing the structure of a control unit in detail.

FIG. 26 is a detailed block diagram showing the structure of a control device 2 according to the present embodiment.

In FIG. 26, when a substitution process is executed and the substitutionally inputting word and phrase are inputted in the input word and phrase memory unit 204, a substitutional word and phrase register unit 201 registers the selected word and phrase in a substitutional word and phrase memory unit 207 corresponding to the word and phrase thus inputted. The substitution unit 34 retrieves from the substitutional word and phrase memory unit 207 the substitutional word and phrase previously selected using the substitutional word and phrase memory retrieving unit 206 corresponding to the inputted word and phrase previously substituted and registered in the input word and phrase memory unit 204. Any other structures are the same as those shown in FIG. 11. Therefore, the description thereof will be omitted.

Figure 20:
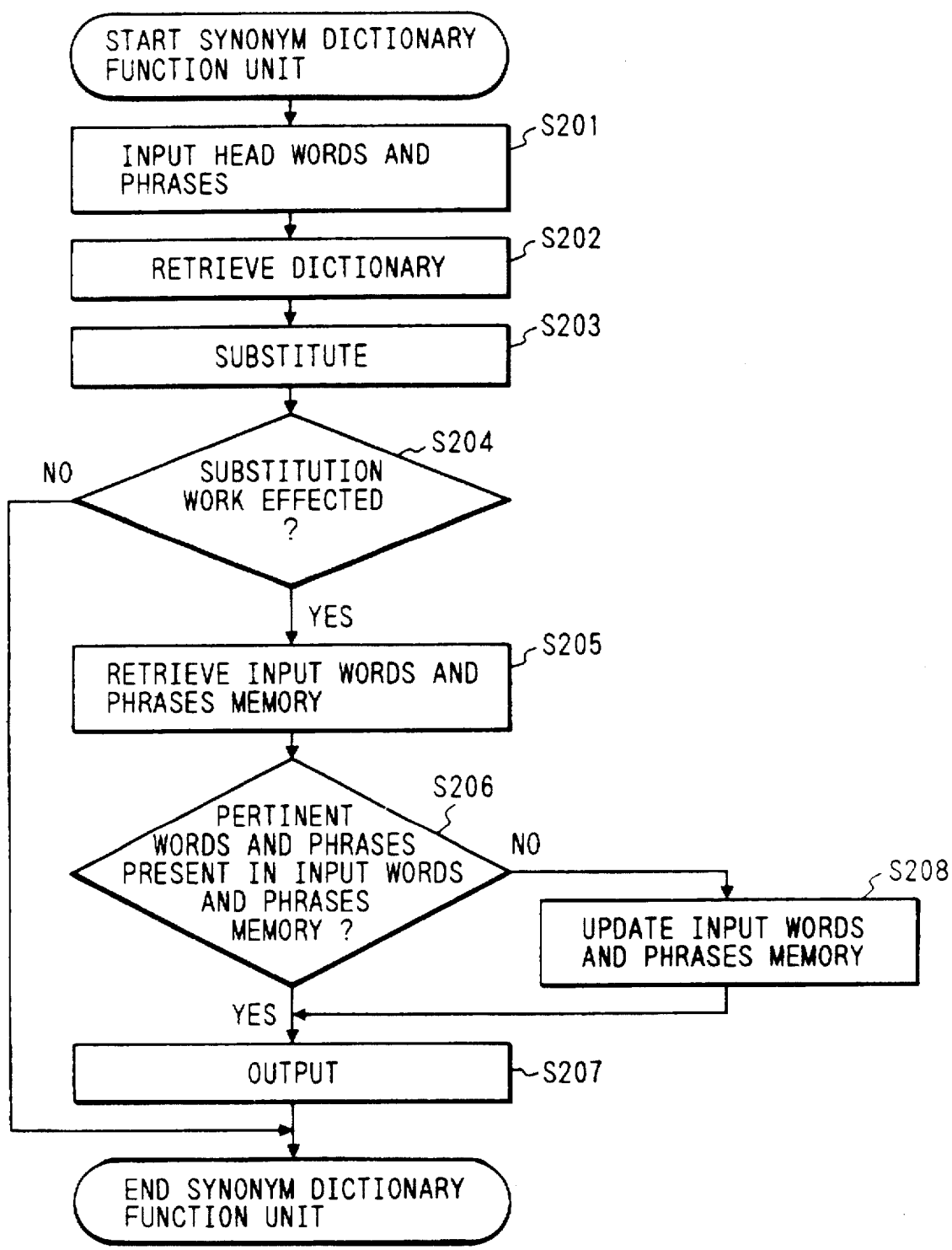
FIG. 20 is a flowchart showing the synonym retrieving steps according to a fifth embodiment.

In the present embodiment, any processes by the synonym dictionary function unit are almost the same as those of the Embodiment 5 shown in FIG. 20. However, when the inputted words and phrases are renewed in the step S208, the steps in which the substitutional words and phrases are registered will be taken in succession. This is only the difference between them, and any others are the same. Therefore, the flowchart showing such steps will be omitted. According to the present embodiment, when the substitutional word and phrase are registered as described above, the same substitution as previously executed will be effectuated by use of the registered substitutional word and phrase instead of the warning beep as in the Embodiment 5. In other words, in the flowchart shown in FIG. 21 for the document input steps according to the Embodiment 5, a substitution of the inputted word and phrase is executed instead of the warning beeping in the step S218. In this respect, it may be possible to make an arrangement so that this substitution process is executed only when the execution is instructed by the user after requesting the user's decision on whether the substitution should be executed or not. The other steps required for executing the input processes according to the present embodiment is the same as those in the Embodiment 5 shown in FIG. 21. Therefore, the description thereof will be omitted.

Now, the above-mentioned process will be described using an example of the operation shown in FIG. 14 and FIGS. 28 to 30.

The contents of the synonym dictionary data base 121 are as shown in FIG. 14. FIG. 27 illustrates a user's document in the process of production. The mark ▮ represents a cursor.

Here, it is assumed that the user regards the expression "Curse it" in the cursor position as inappropriate and actuates the synonym dictionary function unit 17 in order to obtain some other expression.

When actuated, the synonym dictionary function unit 17 acquires the head word and phrase "Curse it" in step S201.

Continuously in step S202, the process is executed to search the synonym dictionary data base 121 using the phrase "Curse it" and produce a list of candidate words and phrases.

Further, proceeding to step S203, the process will be executed to provide the user with the foregoing list of candidate words and phrases. If user selects any word and phrase, the phrase "Curse it" is substituted by such a selection. Here, assuming that the user has selected the word "Tut", the description will continue.

In step S204, whether a substitution is executed in the step S203 or not is judged. Here, since the word "Tut" has been selected, the judgment is affirmative.

Therefore, proceeding to step S205, the process will be executed to retrieve whether the phrase "Curse it" is present in input word and phrase memory unit 204 or not is retrieved. Here, the phrase is not present, the process will proceed to step S208 where the phrase "Curse it" is registered in the input word and phrase memory unit 204 by means of the input word and phrase updating unit 202. Further, the word "Tut" is registered in the substitutional word and phrase memory unit 207 by means of the substitutional word and phrase register unit 205. Then, in step S207, the result is output to the control unit 12 to terminate the processes in the synonym dictionary function unit 17.

FIG. 28 illustrates an example of the contents of the input word and phrase memory unit 204 as well as the substitutional word and phrase memory unit 207 thus updated as described above. FIG. 29 is a view illustrating a state that the user has further written on the document. While the user is inputting a document, the document input function unit 28 operates at all times, but hereunder, the description will begin at the point where a space is written in the cursor position as shown in FIG. 29.

At this juncture, the process is in the step S211. However, since the document input is continuously executed, the process will proceed to step S212 where the letters " " inputted by the user using the letter input unit 30 are acquired and stored in the document memory.

In step S213, whether the letters " " are a delimiter or not is detected. Here, the letters " " is a delimiter, the process will proceed to step S215 where the phrase "Curse it" present in the position defined by the foregoing delimiter is picked up, and in step S216, whether the phrase "Curse it" is present in the input word and phrase memory unit 204 or not is retrieved. Here, the phrase is present. Therefore, the process will proceed from the step S217 to step S218 where the word "Tut" in the substitutional word and phrase memory unit 207, which is found to be corresponding to the phrase "Curse it" by means of the substitution unit 34, is retrieved by the substitutional word and phrase memory retrieving unit 206. Thus, the newly inputted phrase "Curse it" is substituted by the word "Tut", and then, the process will return to the step S211.

FIG. 30 shows an example of a document thus produced, in which the expression "Curse it" that the user has considered inappropriate is not present, but it is expressed by the word "Tut" instead.

As described above, in the apparatus according to the present embodiment, when the word or phrase which has been the object of the substitution once by the synonym dictionary function unit is again inputted, that is, a case where the user has again inputted the word or phrase that the user considers inappropriate himself, it is possible to automatically detect such an event and operate the same substitution as previously executed. Also, when a plurality of users produce a document using a single document processing apparatus, it is possible for the latter user to avoid using the words or the phrases that the former user has considered inappropriate, thus enabling the synonym dictionary function to be utilized more effectively.

[Embodiment 7]

The present embodiment is such that when the frequency of use is counted, the words which constitute an idiom in a document are counted as an idiom and not as words with respect to its frequency of use.

Figure 31:
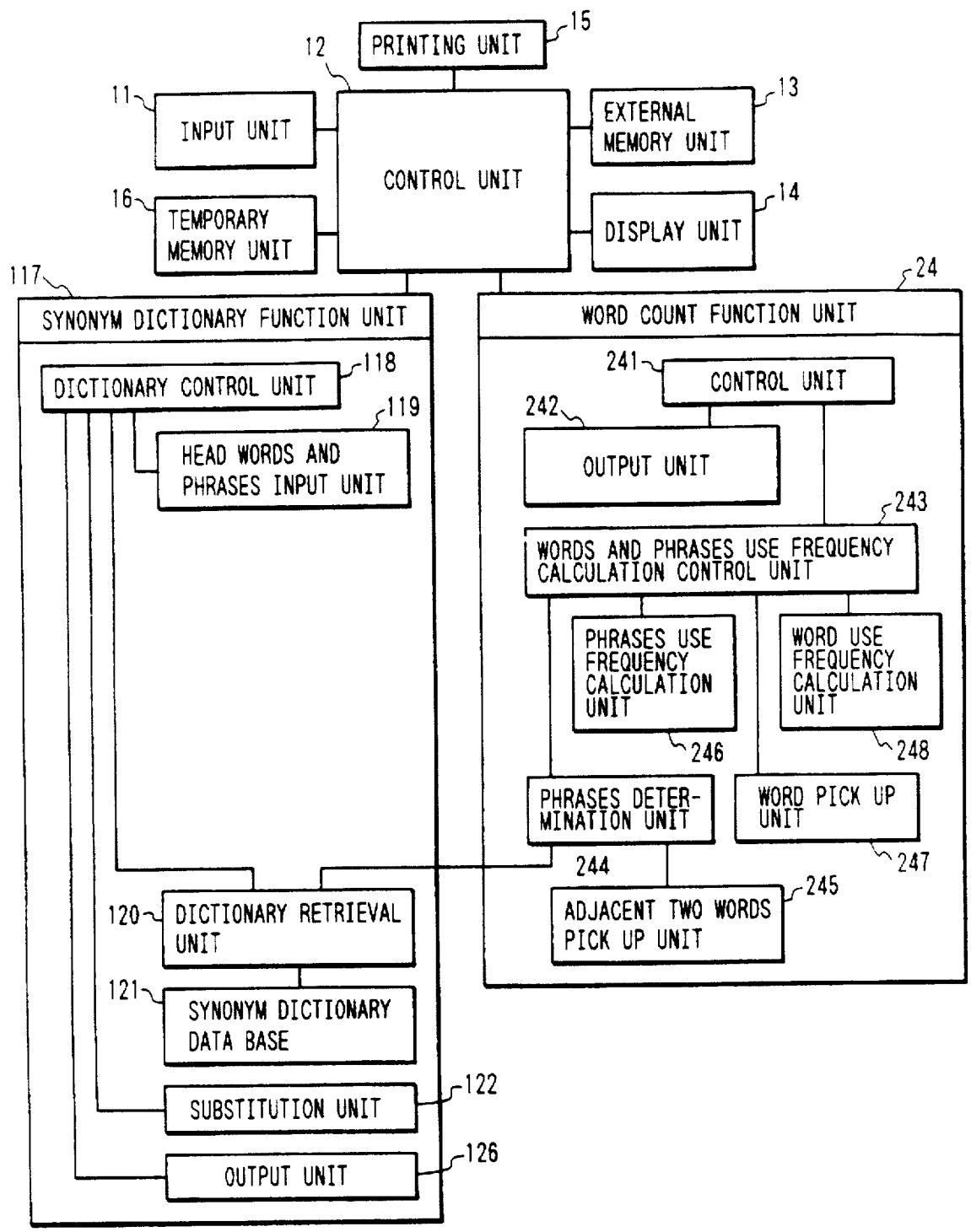
FIG. 31 is a block diagram showing the structure of a control unit in detail.

FIG. 31 is a detailed block diagram showing the structure of the control device 2 according to the present embodiment. The structure of each unit of the synonym dictionary function unit 117 is the same as the structure shown in FIG. 11. Therefore, the description thereof will be omitted.

The word count function unit 24 is controlled by the control unit 12. The output unit 242 and the word and phrase use frequency calculation control unit 243 are controlled by the control unit 241. The output device 242 outputs the result provided by the control unit 241 to the control unit 12. The word and phrase use frequency calculation control unit 243 calculates the frequency of use of each of the words and phrases in a sentence provided by the control unit 241 by means of an idiom determining unit 244, idiom use frequency calculation unit 246, word pick up unit 247, and word use frequency calculation unit 248. The idiom determining unit 244 instructs the adjacent two-word pick up unit 245 to operate a pick up and retrieves the synonym dictionary data base 121 by means of the dictionary retrieving unit 120 using the combination of the picked up words. The result is supplied to the word and phrase use frequency calculation control unit 243. The idiom use frequency calculation unit 246 calculates the frequency of use of the idioms provided for the word and phrase use frequency calculation control unit 243. The word pick up unit 247 picks up the words from a sentence provided for the word and phrase use frequency calculation control unit 243. The word use frequency calculation unit 248 adds the frequencies of use of the words provided for the word and phrase use frequency calculation control unit 243.

Figure 32:
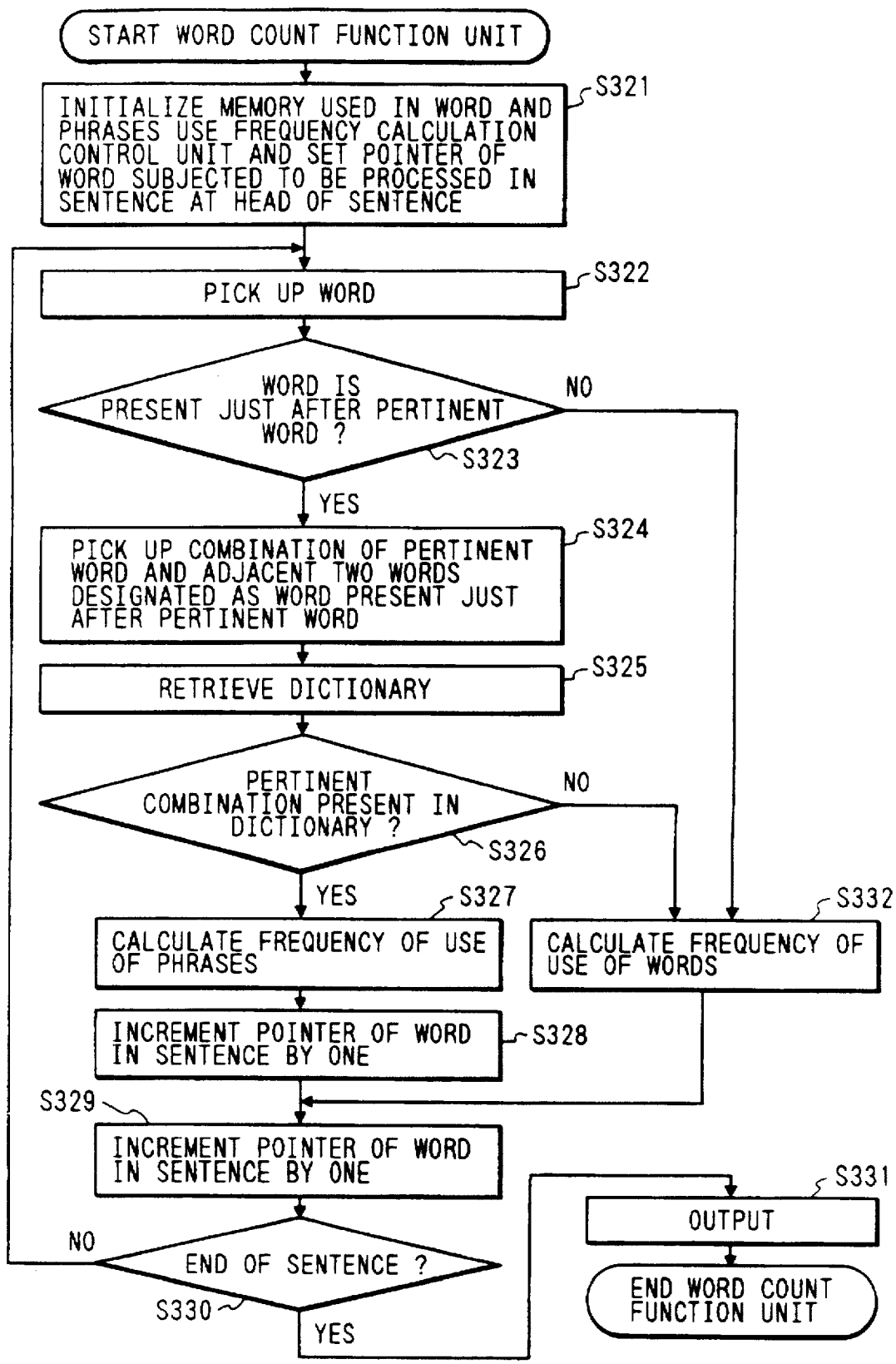
FIG. 32 is a flowchart showing word counting steps.

Hereinafter, with reference to a process flowchart shown in FIG. 32, the detailed description will be made of the word count function unit 24.

When the word count function unit 24 is actuated, the memory used for the word and phrase use frequency calculation control unit 243 is initiated as in step S321. The pointer to an objective word for processing is set at the head of a sentence. Then, proceeding to step S322, the process is executed to pick up the word designated by the foregoing pointer from the given sentence by means of the word pick up unit 247. Further, proceeding to step S323, the process is executed to confirm the presence of a word immediately after the foregoing word. If not confirmed, it is interpreted that there is no idiom containing the foregoing word. Thus, the process will proceed to step S332 where the frequency of use of the foregoing word is added by the word use frequency calculation unit 248. The process will return to the step S329.

If the presence of the following word is confirmed in the step S323, the combination of the adjacent two-word, the foregoing word and the following word, is picked up in step S324 by means of the adjacent two-word pick up unit 245. Thus, in step S325, the synonym dictionary data base 121 is retrieved by the dictionary retrieving unit 120 using the foregoing combination as the head word and phrase.

As a result of the retrieval, no such combination is detected in the dictionary, the combination is not regarded as any idiom. Thus, the process will proceed from the step S326 to step S332. If the combination is present in the dictionary, the foregoing combination is regarded as an idiom. The process will proceed from the step S336 to the step S337 where the frequency of use of such idiom is added by means of the idiom use frequency calculation unit 246.

Further, proceeding to step S328, the process is executed to increment the pointer to the objective word for processing in the sentence. This process is to avoid counting the immediately following word twice as a word despite it has been already counted as a constituent word of an idiom. In step S329, the pointer to the objective word for processing in the sentence is incremented by one. In step S330, whether the sentence comes to an end or not is judged. If not ended, the process will return to the step S322.

If the sentence is ended, the process will proceed to step S331 where the result is output by the output unit 242 to the control unit 12. Thus, the operation in the word count function unit 24 is terminated.

Now, using FIG. 33 to FIG. 35, the above-mentioned steps will be described.

FIG. 33 illustrates an example of a sentence inputted by a user. The contents of the synonym dictionary data base 121 are assumed to be the same as those shown in FIG. 14. FIG. 34 represents the frequency of use calculated for each word by the conventional word counting function.

When the word count function unit 24 is actuated, the memory is initialized as in the step S321. The pointer to the objective word for process in the sentence is set at the head of the sentence. In the example shown in FIG. 33, a word "Mr." is set. Then, proceeding to the step S322, the process is executed to pick up a word designated by the foregoing pointer from a given sentence. Here, the word "Mr." will be picked up.

Further, proceeding to the step S323, the process will confirm the presence of a word immediately following the foregoing word in the document. If not confirmed, the existence of any idiom containing the foregoing word is negated. Hence, the process will proceed to the step S332. Here, a word "Brown" is confirmed. Therefore, the process will proceed to the step S324, and the adjacent two words, "Mr." and "Brown", are picked up. Then, in the step S325, the synonym dictionary data base 121 is retrieved using a combination "Mr. Brown" made by the foregoing two words as the head word and phrase.

Here, as the result of the retrieval, the word combination "Mr. Brown" is not regards as any idiom because no "Mr. Brown" is present in the synonym dictionary data base 121. Thus, the process will proceed to the step S332 where the frequency of use of the word "Mr." is added. The frequency of use of Mr. is now one. Then, proceeding further to the step S329, the process is executed to increment the point by one so that the word "Brown" is set. In continuation, whether the sentence comes to an end or not is determined in the step S330. Here, it is not ended. The step will return to the step S322, accordingly.

Thereafter, the same steps will be repeated until the pointer is set at a word "made" on the sixth line in FIG. 33.

When the pointer is set at the forgoing word "made" and the process returns to the step S322, a word combination "made over" is made in the steps S323 to S325 as the pick up word and phrase. Using this combination the synonym dictionary data base 121 is retrieved. Here, the combination "made over" is present in the synonym dictionary data base 121, and the "made over" is regarded as an idiom. Therefore, the process will proceed from the step S326 to the step S327 where the frequency of use of the idiom "made over" is added. Thus, the frequency of use of the idiom "made over" is now one.

Further, proceeding to the step S328, the pointer to the objective word for processing in a sentence is incremented by one. This process is to avoid counting the immediately following word "over" twice despite it has been already counted once as a part of the constituents of the idiom "made over". Further, proceeding to the step S329, the process is executed to increment the pointer to the objective word for processing in the sentence by one.

Thereafter, the steps described above will be repeated until the pointer is set at a word "say" on the tenth line in FIG. 33.

When the pointer is set at the foregoing word "say" in the step S329, the process will proceed to the steps S330, S322, and S323. However, there is no word to follow the word "say". Therefore, the process will proceed to the step S332 where the frequency of use of the word "say" is added. Thus, the frequency of use of the word "say" is now one. Further, proceeding to the step S329, the process is executed to increment the pointer to the objective word for process in the sentence by one.

Since there is no word immediately following the word "say", it is determined in the step S330 that the sentence has come to an end. Thus, the result is output to the control unit 12, and the operation in the word count function unit 24 is terminated.

FIG. 35 shows the frequency of use of each word calculated as described above. The underlined parts in FIG. 34 and FIG. 35 represent the difference in them.

[Embodiment 8]

The present embodiment is such that the frequency of use of the words which constitute an idiom is counted as an idiom in a document as in the Embodiment 7. According to the present embodiment, the words which may constitute an idiom are designated, and are detected in a document to examine whether such a word is a part of an idiom or not. Also, the examination is executed not only on a designated word and a word immediately following it as in the aforesaid embodiment, but also on a designated word and any other word in the same document to ascertain whether such a combination of words may constitute an idiom or not.

Figure 36:
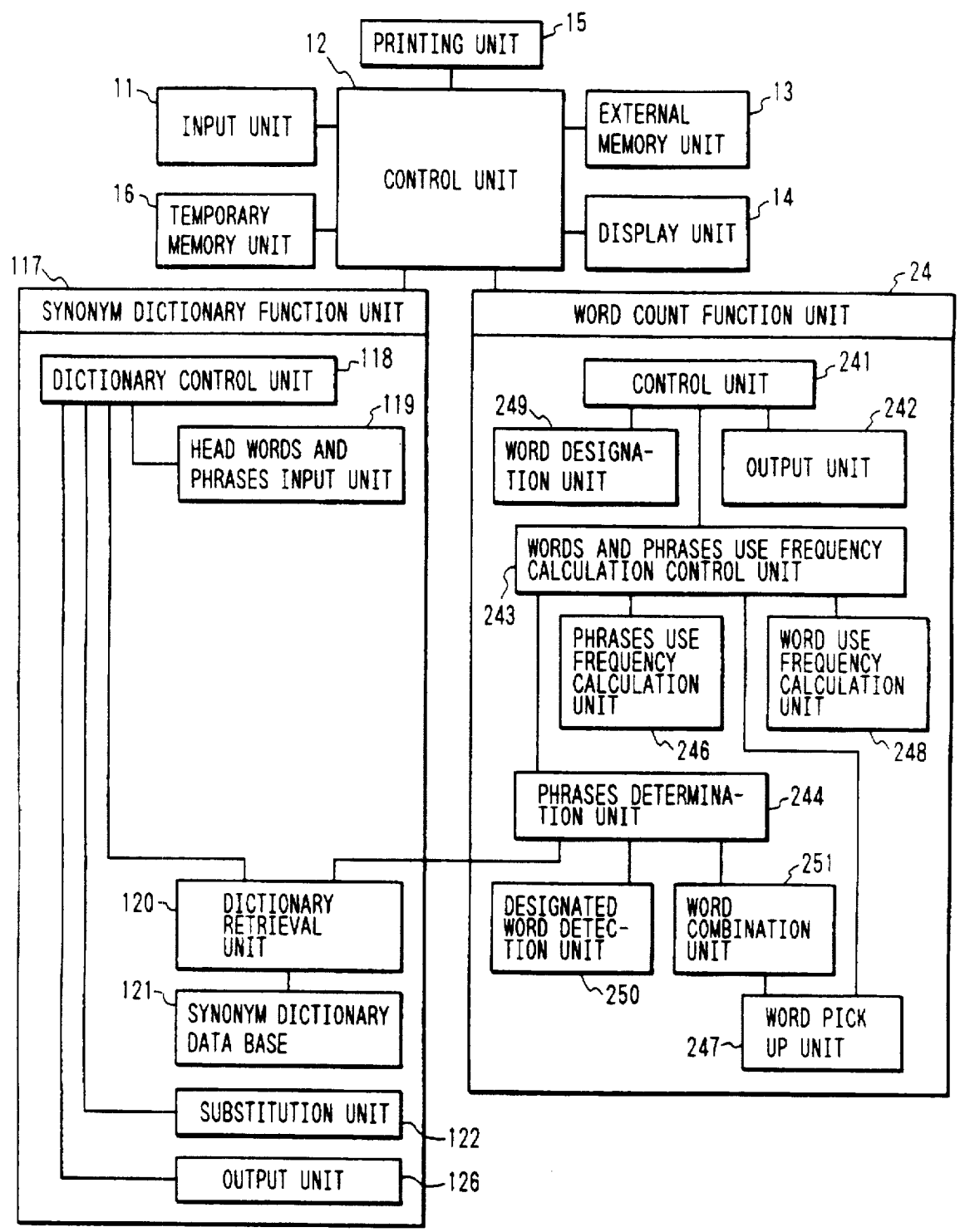
FIG. 36 is a block diagram showing the structure of a control unit in detail.

FIG. 36 is a detailed block diagram showing the structure of the control device 2 according to the present embodiment.

In FIG. 36, the structure of each unit of the synonym dictionary function unit 117 is the same as the structure in the foregoing embodiment. Therefore, the description thereof will be omitted.

The word count function unit 24 is controlled by the control unit 12. A word designating unit 249, word and phrase use frequency calculation control unit 243, output unit 242 are controlled by a control unit 241. The word designating unit 249 is to designate word contained in the synonym dictionary data base 121 in advance. The present embodiment is designed with a particular attention to the characteristics of the synonym dictionary data base that the words constituting the idioms contained in the synonym dictionary data base tend to be specific words. Thus, the specific words are assumably arranged for those words to be designated in the word designating unit 249.

The word and phrase use frequency calculation control unit 243 calculate the frequency of use of each word and phrase in a sentence provided by the control unit 241 by means of the idiom determining unit 244, idiom use frequency calculation unit 246, word pick up unit 247, and word use frequency calculation unit 248.

The idiom determining unit 244 detects whether any word designated by the word designating unit 249 is present in a sentence or not by means of a designated word detecting unit 250, and combines a plurality of words including such a word by means of a word combining unit 251; thus retrieving the synonym dictionary data base 121 by means of the dictionary retrieving unit 120 using the combination thus obtained to supply the result to the word and phrase use frequency calculation control unit 243. In the apparatus according to the present embodiment, the word combining unit 251 picks up an arbitrary word other than the foregoing word by means of the word pick up unit 247 with respect to the sentence containing the foregoing word, and combines these two words thus obtained in its appearing order in a sentence, thus supplying the result of each combination to the idiom determining unit 244.

The idiom use frequency calculation unit 246 adds the frequency of use of the idioms provided for the word and phrase use frequency calculation control unit 243. Also, if there is any word for which its frequency of use has already been added by the word use frequency calculation unit 248 among the arbitrary words contained in the foregoing idioms, the frequency of use of such a word is subtracted.

The word pick up unit 247 picks up a word from a sentence provided for the word and phrase use frequency calculation control unit 243. The word use frequency calculation unit 248 adds the frequency of use of a word provided for the word and phrase use frequency calculation control unit 243. The output unit 242 outputs the result provided for the control unit 241 to the control unit 12.

Figure 37:
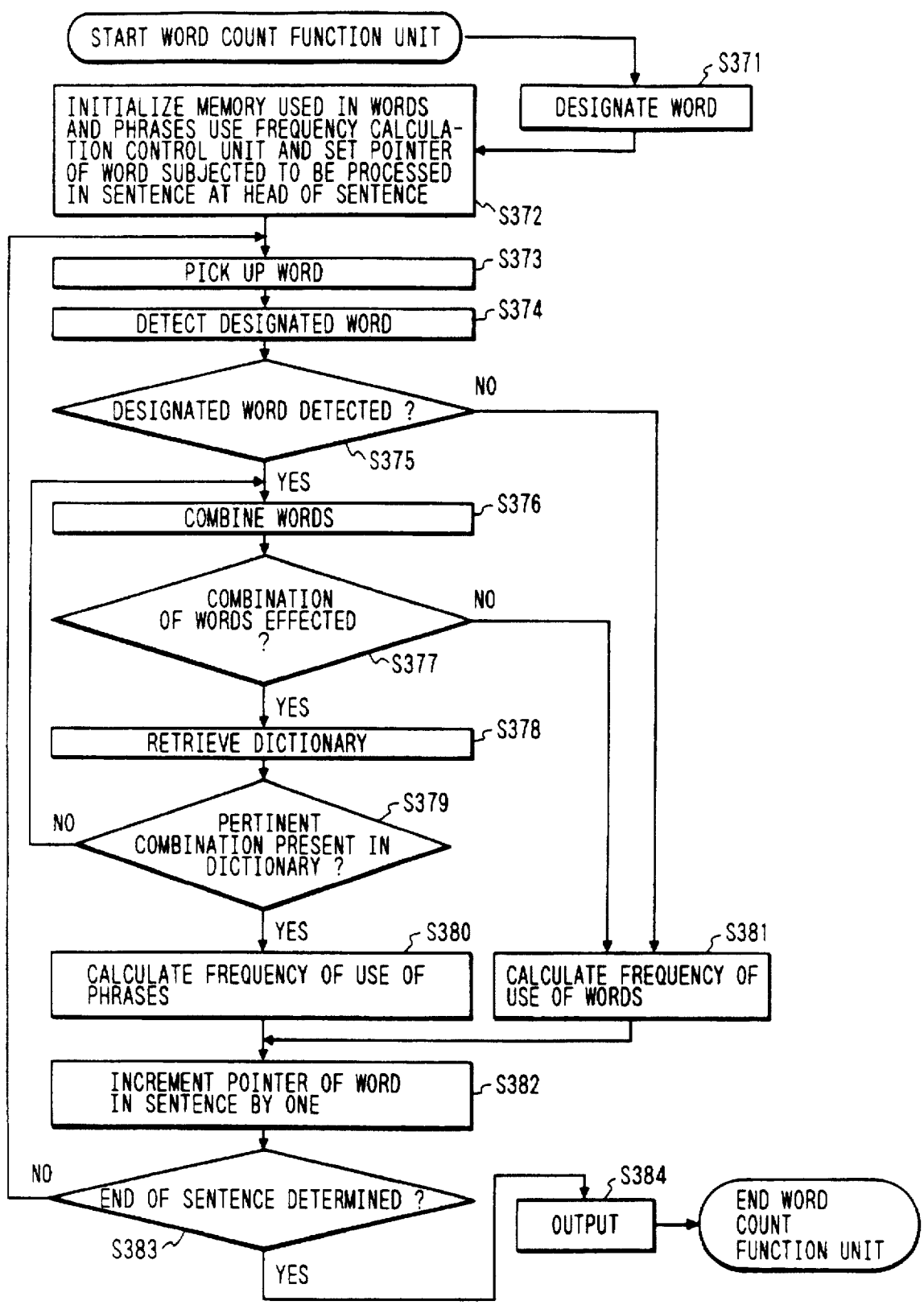
FIG. 37 is a flowchart showing word counting steps.

Hereinafter, with reference to a process flowchart shown in FIG. 37, the word count function unit 24 will be described in detail.

When the word count function unit 24 is actuated, a word which tends to form an idiom in the synonym dictionary data base 121 is designated by the word designating unit 249 in step S371. The present embodiment is designed by giving a particular attention to the characteristics of the synonym dictionary data base that the words which constitute idioms in the synonym dictionary data base tend to be the specific words.

Then, proceeding to step S372, the process is executed to the memory used for the word and phrase use frequency calculation control unit 243 is initialized, and the pointer to an objective word for processing in a sentence is set at the head of the sentence. Proceeding to step S373, the process is executed to pick up a word designated by the foregoing pointer from the sentence by means of the word pick up unit 247.

Further, proceeding to step S374, the process is executed to detect whether the word thus picked up is the one designated by the word designating unit 249 or not by means of the designated word detecting unit 250. If not a designated word, the process will proceed from the step S375 to step S381 where the frequency of use of the foregoing picked up word is added by the word use frequency calculation unit 248, and further proceed to step S382. If a designated word, the process will proceed from the step S375 to step S376 where a plurality of words containing the foregoing word are combined by the word combining unit 251. When all the combination patterns have already been tried, no combination is attempted, and the process will proceed from the step S377 to step S381.

If combined, the process will proceed from the step S377 to step S378 where the synonym dictionary data base 121 is retrieved by the dictionary retrieving unit 120 using the foregoing combination. If no result of the retrieval is confirmed, the process will return from the step S379 to the step S376 where a combination which has not been tried as yet is formed by the word combining unit 251.

If the result of the foregoing retrieval is confirmed, the process will proceed from the step S379 to S380 where the frequency of use of the idiom is added by the idiom use frequency calculation unit 246 on the assumption that such a combination is an idiom. Also, if there is any arbitrary word contained in the foregoing idiom for which its frequency of use is added by the word use frequency calculation unit 248, the frequency of use of the foregoing word is subtracted.

In step S382, the pointer to an objective word for processing in a sentence is incremented by one. In step S383, whether the sentence has come to an end or not is judged. If not, the process will return to the step S373. If the sentence has come to an end, the process will proceed to step S384 where the output unit 242 outputs the result to the control unit 12, thus terminating the operation in the word count function unit 24.

Now, using FIG. 38 to FIG. 40, the above-mentioned processes will be described.

FIG. 38 shows an example of a sentence inputted by a user. The contents of the synonym dictionary data base 121 are the same as those shown in FIG. 14. FIG. 39 shows the frequency of use of each word calculated by the conventional word counting function.

When the word count function unit 24 is actuated, the words in the synonym dictionary data base 121 are designated in the step S371. Here, the underlined words "across", "out", and "over" in FIG. 39 are assumed to be designated.

Then, proceeding to the step S372, the process is executed to initialize the memory used for the word and phrase use frequency calculation and set the pointer to an objective word for processing in a sentence at the head of the sentence. In the present operation, a word "Mr." is set. Then, proceeding to the step S373, the process is executed to pick up the word "Mr." designated by the foregoing pointer from the given sentence.

Further, proceeding to the step S374, the process is executed to detect whether the picked up word is a designated word or not. Since the word "Mr." has not been designated yet, the process will proceed from step S375 to the step S381 where the frequency of use of the word "Mr." is added. The frequency of use of the word "Mr." is now one. In the step S382, the pointer to the objective word for processing in the sentence is incremented by one to set a word "Brown". In the step S383, whether the sentence has come to an end or not is judged. Here, the judgment is negative. Thus, the process will return to the step S373.

Thereafter, the same steps are repeated continuously until the pointer is set at a word "over" on the seventh line in FIG. 11.

When the pointer is set at the foregoing word "over", and the process is returned to the step S373, the process will proceed to the steps S374 to S376. In the step S376, using the word combining unit 251 the process is executed to pick up an arbitrary word other than the foregoing word "over" in a sentence "I want to have this old coat made over." In which the foregoing word "over" is present. Then, whether the result of the combinations of the two words thus obtained in order of its appearance in the sentence is present or not in the synonym dictionary data base 121 is judged. Therefore, at first, a combination "I over" is formed. Then, the process will proceed to the step S377 and S378. However, since this combination "I over" is not present in the synonym dictionary data base 121, the process will return from the step S379 to the step S376. Thereafter, the process "want over", "to over" are formed likewise in that order, but none of them are present in the synonym dictionary data base 121. Lastly, when a combination "made over" is formed, this combination is present in the synonym dictionary data base 121 as shown in FIG. 14. Thus, the process will proceed from the step S379 to the step S380 where the frequency of use of the combination "made over" is added. The frequency of use of the combination "made over" is now one. If there is any word, either "made" or "over" contained in the combination "made over", for which the frequency of use of such word has already been added, the frequency of use will be subtracted, but here, no subtraction is made. The process will proceed to the step S382.

Thereafter, the processes described above will be repeated until the pointer is set at the word "across" in the ninth line in FIG. 11.

When the pointer is set at the word "across" and the process proceeds to the step S382, the pointer to the objective word for processing in the sentence is incremented by one. Then, it is interpreted in the step S383 that the sentence has come to an end, and the process will proceed to the step S384. The result is output to the control unit 112. Hence, the operation in the word count function unit 24 is terminated.

FIG. 40 illustrates the frequency of use of each word thus calculated as above. The underlines in FIG. 39 and FIG. 40 show the points which differ from each other.

According to the apparatus of the present embodiment, it is possible to extract an idiom made by the words which are not adjacent to each other, such as "get", "across", or the like, which is not extractable by the apparatus of the Embodiment 7.

[Embodiment 9]

The present embodiment is such that any words which are not contained in the synonym dictionary are removed from the list of the frequency of use.

Figure 41:
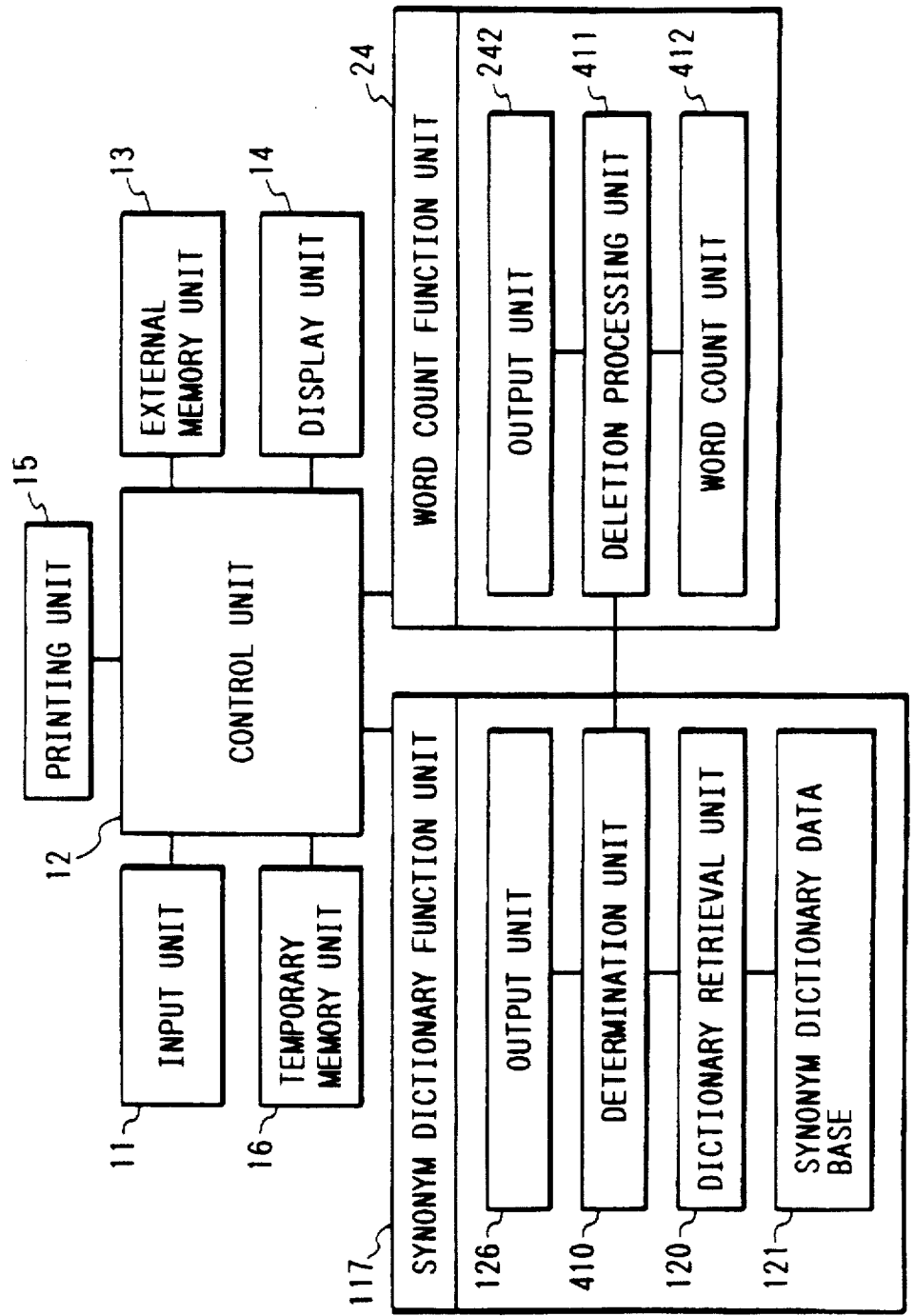
FIG. 41 is a block diagram showing the structure of a control unit in detail.

FIG. 41 is a detailed block diagram showing the structure of the control device 2 according to the present embodiment.

The synonym dictionary function unit 117 is controlled by the control unit 12 to retrieve the synonym dictionary data base 121 by means of the dictionary retrieving unit 120 using given word and phrase. Further, the presence and absence of substitutional words and phrases are confirmed by a determining unit 410. The result is output to the control unit 12 by use of the output unit 126.

The word count function unit 124 is controlled by the control unit 12 to calculate the frequency of use of each of the words constituting a given text by means of a word counting unit 412. At this juncture, the words and phrases which are not contained in the synonym dictionary are removed from the counting object by means of a removal processing unit 411. The result is output to the control unit 12 by use of the output unit 242. Here, the removal processing unit 411 removes those determined by the determining unit 410 as being removed from the object words and phrases. Also, there are conceivably two types of the removal processing unit 411; one is to execute the removal while actuating the determining unit 410 at any time with respect to the words and phrases in a sentence when the word counting unit 412 is in operation; and the other is to remove the unwanted words and phrases by actuating the determining unit 410 with respect to a list which is prepared after the word counting unit 412 has counted all the words. For the present embodiment, it is assumed that the latter type is adopted in attempting the enhancement of the processing speed.

Hereinafter, with reference to a process flowchart shown in FIG. 42, the word count function unit 24 will be described in detail.

When the word count function unit 24 is actuated, the process is executed to count the frequency of use of each of the words constituting a text provided in the step S231 by use of the word counting unit 412 to produce a list of the frequency of use for each of the words and phrases in the sentence.

Then, proceeding to step S232, the process is executed to increment the pointer to the objective word for processing in the sentence by one. Here, in step S233, whether the list of the foregoing frequency of use has ended or not is judged. If ended, the process will proceed from step S234 where using the output unit 242, the result is output to terminate the operation in the word count function unit 24.

On the other hand, if the foregoing list of the frequency of use is not ended yet, the process will proceed to step S235 where using the determining unit 410, whether the foregoing word and phrase are present in the synonym dictionary data base or not is judged. If present, the process will return to the step S232. If not, the process will proceed to step S236 where the foregoing word and phrase are removed from the foregoing list of the frequency of use, and then, the process will return to the step S232.

Now, using an examples shown in FIG. 43 to FIG. 46, the above-mentioned steps will be described.

Figures 42, 43:
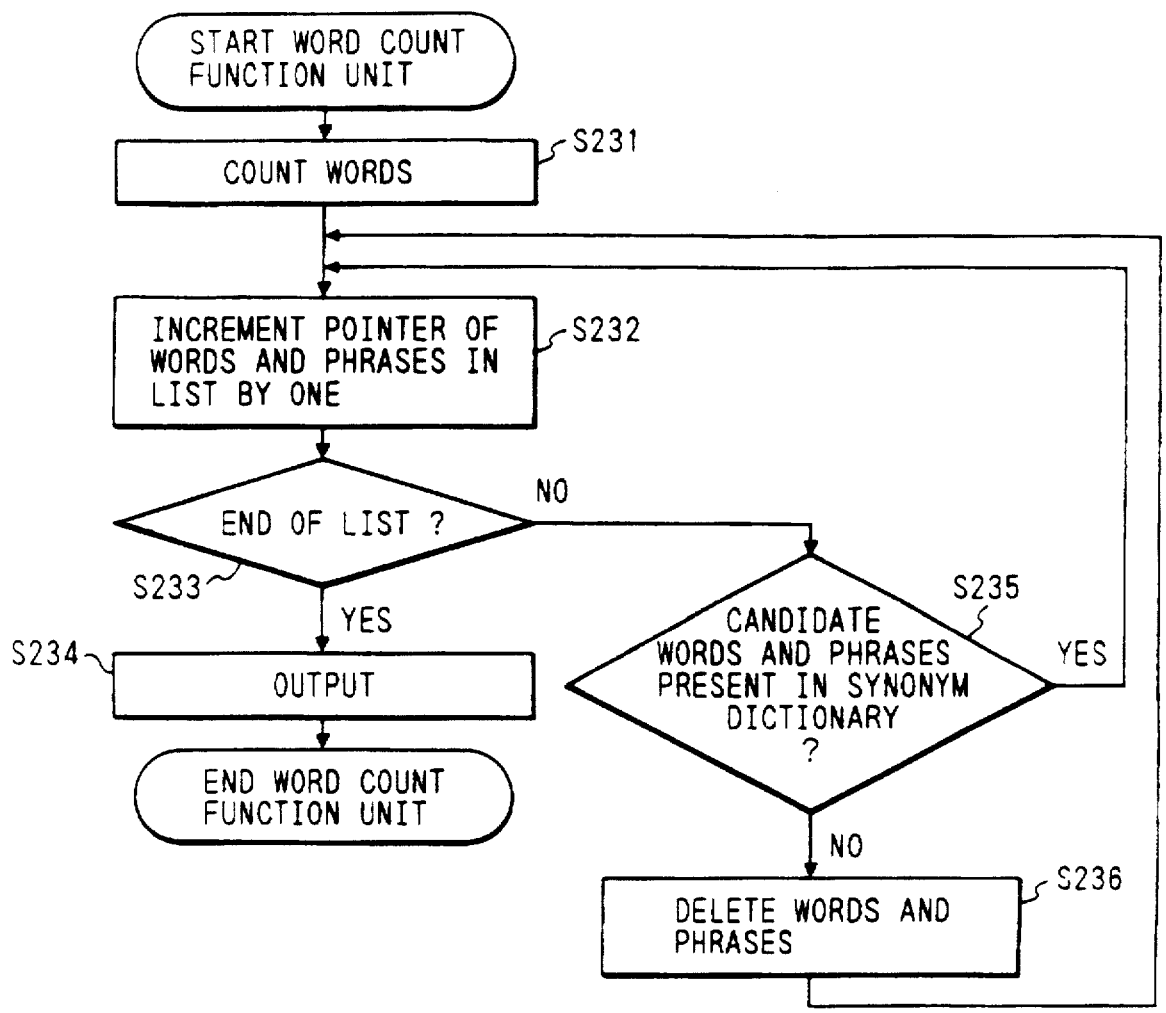
FIG. 42 is a flowchart showing word counting steps.
FIG. 43 is a view showing an example of a document produced.

FIG. 43 illustrates a sentence inputted by a user.

Here, when the word count function unit 24 is actuated, a list of frequency of use of each of the words and phrases in a sentence as shown in FIG. 44 is produced at first in the step S231.

In the step S232, a word "a" is processed. Since the list of the frequency of use has not been ended as yet, the process will proceed from the step S233 to the step S235.

The contents of the synonym dictionary data base according to the present embodiment are as shown in FIG. 14. Now that no "a" is present in the synonym dictionary in the step S235, the word "a" is removed from the list of the frequency of use. The process will return to the step S232 to take the same steps thereafter with respect to each of the words and phrases in the list of the frequency of use. When these steps have been taken to end the use of the list, the result as shown in FIG. 45 is output in the step S234 to terminate the operation.

[Embodiment 10]

The present embodiment is also such as to remove the words which are not contained in the synonym dictionary from the list of the frequency of use as in the foregoing embodiment. According to the present embodiment, the counting is suspended and then, the removal process is executed when the memory becomes full.

Figure 46:
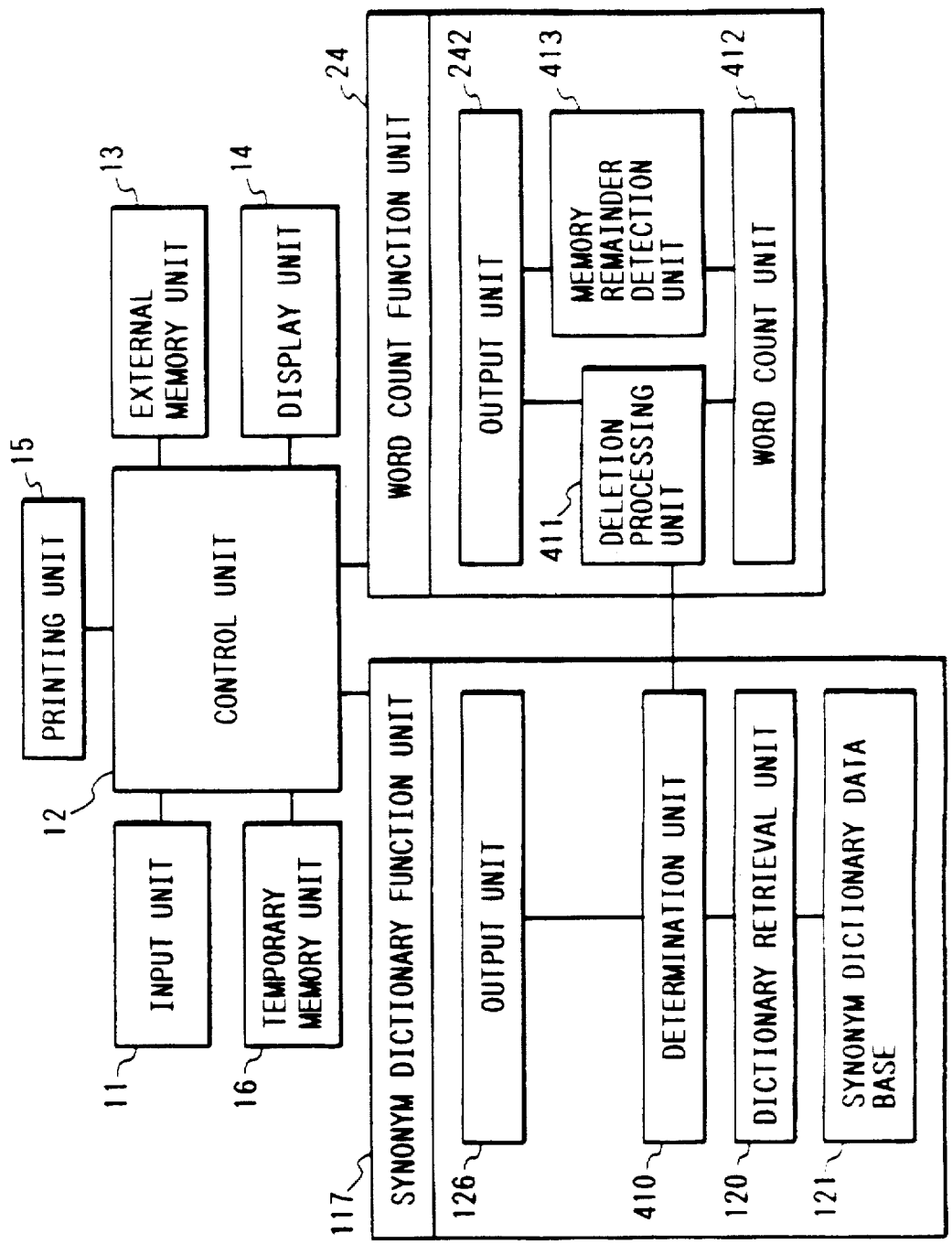
FIG. 46 is a block diagram showing the structure of a control unit in detail.

FIG. 46 is a detailed block diagram showing the structure of a control device 2 according to the present embodiment.

Here, the word count function unit 24 calculates the frequency of use of each of the words constituting a given text by means of the word counting unit 412 while confirming the unused memory at any time by means of a memory remainder detecting unit 413. When the memory remainder detecting unit 413 detects a state of the memory full, the counting by the word counting unit 412 is suspended. Then, the word counting is resumed while removing the word and phrase which are not contained in the synonym dictionary as required by means of the removal processing unit 411. Lastly, using the output unit 242, the result is output to the control unit 12. Here, the removal processing unit 411 is assumed to have determined whether the object words and phrases should be removed or not by means of the determining unit 410.

Hereinafter, with reference to a process flowchart shown in FIG. 42, the word count function unit 24 will be described in detail.

When the word count function unit 24 is actuated, the process is executed to detect the unused amount of the memory provided for the word count function unit 24 by means of the memory remainder detecting unit 413 in step S471. If any unused memory is detected, the process will proceed from the step S471 to step S473 where the pointer to the object word and phrase for processing in a sentence inputted by a user is incremented by one. In step S474, using the word counting unit 412 the information regarding the frequency of use of the word and phrase designated by the foregoing pointer are stored in the foregoing memory. In step S475, if the end of the sentence is detected, the process will proceed to step S476 where the result is output using the output unit 242, and the operation in the word count function unit 24 is terminated. If the end of the sentence is not detected in the step S475, the process will return to the step S471.

On the other hand, if a memory full is detected in the step S471, the process will proceed from the step S472 to step S477 where the foregoing memory is initialized and the forgoing pointer is returned to the head of the sentence. In step S478, the foregoing pointer is incremented by one. In step S479, using the word counting unit 412 the information regarding the frequency of use of the word and phrase designated by the forgoing pointer are stored in the foregoing memory. In step S480, using the determining unit 410, whether the foregoing word and phrase are present in the synonym dictionary data base or not is judged. If present, the process will proceed to step S482. If not, the process will proceed to step S481 where the information of the frequency of use of the foregoing word and phrase is deleted from the foregoing memory. Thus, the process will proceed to step S482.

If it is judged in step S482 that the sentence has ended, the process will proceed to step S476. If not, the process will return to the step S478.

Now, using FIG. 48 to FIG. 53, the above-mentioned steps will be described.

FIG. 48 illustrate the memory provided for the word count function unit 24, which has a capacity of storing the information equivalent to ten pieces of words and phrases. FIG. 49 shows an example of a sentence inputted by a user, which illustrates a case where the sentence is small enough against the processing capacity of the foregoing memory.

Here, when the word count function unit 24 is actuated, the process is executed to detect the remainder of the memory at first in the step S471. Since the unused memory is detected, the process proceeds from the step S472 to the step S473 where the pointer to the object word and phrase for processing given by the user is incremented by one. In other words, a word "that" is the object of the processing. In the step S474, the information regarding the frequency of use "1" of the word "that" is stored in the foregoing memory. The process will proceed to the step S475, but since the end of the sentence is not detected in it, the process will return to the step S471. These steps will be repeated until a word "animal". Then, lastly, the process will proceed to step S476 where the result is output, and the operation in the word count function unit 24 is terminated. FIG. 50 is a view showing the content of the memory when the operation of the word count function unit 24 is terminated.

Here, it is assumed that the sentence shown in FIG. 43 is the one inputted by the user. Then, the sentence becomes too great against the processing capacity of the forgoing memory. Hereinafter, this example will be described.

Here, when the word count function unit 24 is actuated, the remainder of the memory is detected at first in the step S471. The process will proceed from the step S472 to the S473 where the pointer to the object word and phrase for processing in the sentence inputted by the user is incremented by one. In other words, a word "that" becomes an object of the processing. In the step S474, the information regarding the frequency of use "1" of the word "that" is stored in the memory. The process will proceed to the step S475, but the end of the sentence is not detected. Therefore, the process will return to the step S471. These steps will be repeated until a word "said" FIG. 51 is a view showing the words processed so far by underlines. At this juncture, the content of the foregoing memory is such as shown in FIG. 52.

Here, when the process returns to the step S471, a memory full is detected. Therefore, the process will proceed from the step S472 to the step S477 where the foregoing memory is initialized and the forgoing pointer is returned to the head of the sentence. In the step S478, the foregoing pointer is incremented by one, that is, the word "that" is not the object of the processing. In the step S479, the information of the frequency of use "1" of the word "that" is stored in the foregoing memory. In the step S480, it is judged that there is no word "that" contained in the synonym dictionary data base 121. Therefore, the process will proceed to the step S481 where the information regarding the frequency of use of the word "that" is deleted. Thus, the process will proceed to the step S482. Thereafter, these steps will be repeated until when the end of the sentence is detected. If a word "animal" or the like which is contained in the synonym dictionary data base becomes an object of a processing, the step S481 is canceled. The information regarding the frequency of use of the foregoing word will remain in the foregoing memory. Lastly, the process will proceed from the step S482 to the step S476 where the result is output. Hence, the operation in the word count function unit 24 is terminated. FIG. 53 shows the content of the foregoing memory when the operation in the word count function unit 24 is terminated.

As described above, in the apparatus according to the present embodiment, it is possible to provide the information regarding the frequency of use which is necessary but just sufficient enough by removing from the list of the frequency of use the objective words and phrases which cannot be substitutional.

In the above-mentioned steps, if the memory becomes full, the memory is cleared and the pointer is returned to the head of the sentence. Then, while checking whether each of the words in the sentence is present in the synonym dictionary or not, the word counting is again executed. However, it may be possible to suspend the word counting once when the memory becomes full, and then, check the list of the frequency of use in order to remove those words which are not contained in the synonym dictionary, thus resuming the word counting from where it is suspended. After the word counting is resumed, it may be possible to continue the word counting either by checking whether or not each of the words in the sentence is in the synonym dictionary or by checking the list of the frequency of use again when the memory become full after simply carrying on the word counting.

[Embodiment 11]

The present embodiment is such that the words registered by a user are removed from the list of the frequency of use.

Figures 54, 55:
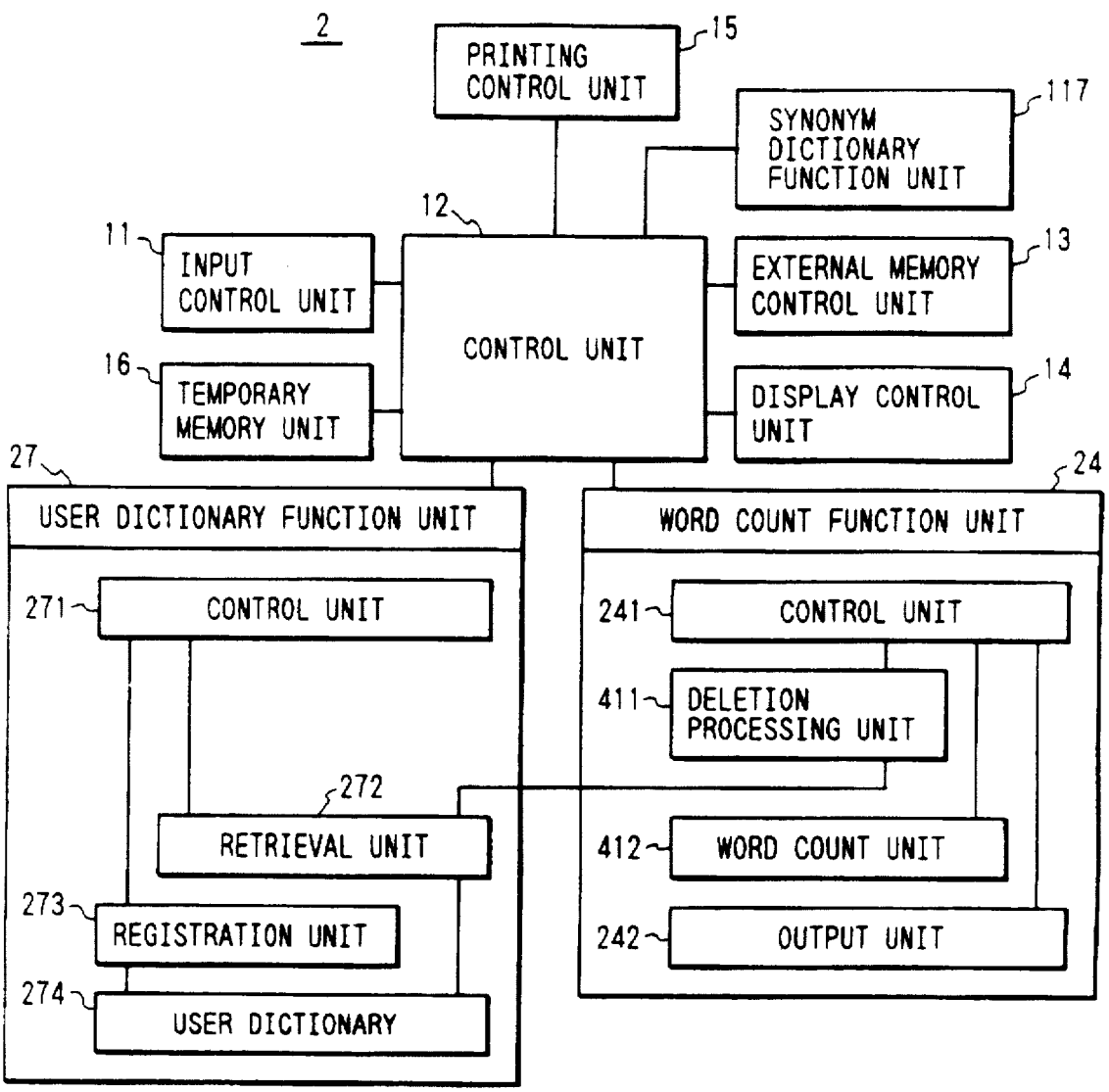
FIG. 54 is a block diagram showing the structure of a control unit in detail.
FIG. 55 is a view showing an example of a document produced.

FIG. 54 is a detailed block diagram showing the structure of the control device 2 according to the present embodiment. In FIG. 54, the user's dictionary function unit 27 is controlled by the control unit 271 to register given words and phrases in the user's dictionary 274 by means of a register-ing unit 273 or to retrieve the user's dictionary 274 on the basis of the given words and phrases by means of a retrieving unit 272.

The word count function unit 24 calculates the frequency of use of each of the words and phrases constituting a given text by means of the word counting unit 412 under the control of the control unit 241. Thus, the words and phrases detected by the retrieving unit 272 as being in the user's dictionary 274 are removed by the removal processing unit 411 from the result of the counting. The counting result is then output to the control unit 12 by use of the output unit 242. Conceivably, there are two types of the method for actuating the removal processing unit 411, a first method which executes the removal processing at any time with respect to the words and phrases in the sentence for which the word counting is in operation, and a second method which executes the removal processing with respect to the list of the counting results, which has been completed after the counting. In the present embodiment, the second method is adopted in attempting the enhancement of the processing speed. The synonym dictionary function unit 27 provides the substitutional candidate words and phrases for the given head words and phrases.

The word counting process according to the present embodiment is such that in the word counting process in the Embodiment 9 shown in FIG. 42, the words registered in the user's dictionary are removed in place of the removal of the words which are not contained in the synonym dictionary. All other steps are the same as those shown in FIG. 42. Therefore, utilizing the flowchart shown in FIG. 42, the description will be made of a specific example with reference to FIG. 55 to FIG. 58 while interpreting the steps S235 and S236 as those required to remove the words registered in a user's dictionary instead of the removal of the words which are not contained in the synonym dictionary.

FIG. 55 shows an example of a sentence inputted by a user, which will be an object of word counting. FIG. 56 illustrates a list of the frequency of use prepared from the document shown in FIG. 55 by means of the word count processing. FIG. 57 is a view showing an example of the stored contents in a user's dictionary 274. Here, a person's name "Tom" is registered.

When the data on the user's sentence shown in FIG. 55 are inputted and the word count function unit 24 is actuated in step S231, a list of the frequency of use of each of the words and phrases in the sentence is produced as shown in FIG. 56. Then, in step S232, a process is executed with respect to a word "a" shown in FIG. 56. Continuously in steps S233, S235, and S236, whether the above-mentioned word "a" is stored in the user's dictionary 274 or not is judged. Since the judgement is negative (NO), the process will return to the step S232 and take the same steps with respect to the following words "giant" and "that". Then, when an objective word and phrase comes to a word "Tom", this word "Tom" is removed from the list shown in FIG. 56 because the word "Tom" is contained in the user's dictionary 274. Lastly, in step S234, the list is output as shown in FIG. 58.

FIG. 58 is a view showing an output example of the list of the frequency of use for the words and phrases to be prepared by the word count function unit 24 according to the present embodiment. Now that the removal processing unit 411 has removed the proper noun "Tom" shown in FIG. 57 from the list shown in FIG. 56, there is no output of this word in those of the list of the frequency of use of the words and phrases.

[Embodiment 12]

The present embodiment is also such that the words registered in a user's dictionary are removed from a list of the frequency of use as in the Embodiment 11. In the present embodiment, if the memory is full, the counting is suspended and the removal process is executed as in the Embodiment 10.

Therefore, the control device 2 of the present embodiment is structured in such a manner that the memory remainder detecting unit 413 of the Embodiment 10 shown in FIG. 46 is added to the word count function unit 24 in the control device 2 of the Embodiment 11 shown in FIG. 54. Any other points are the same as those shown in FIG. 54. Therefore, no drawing thereof is provided herein.

Figure 47:
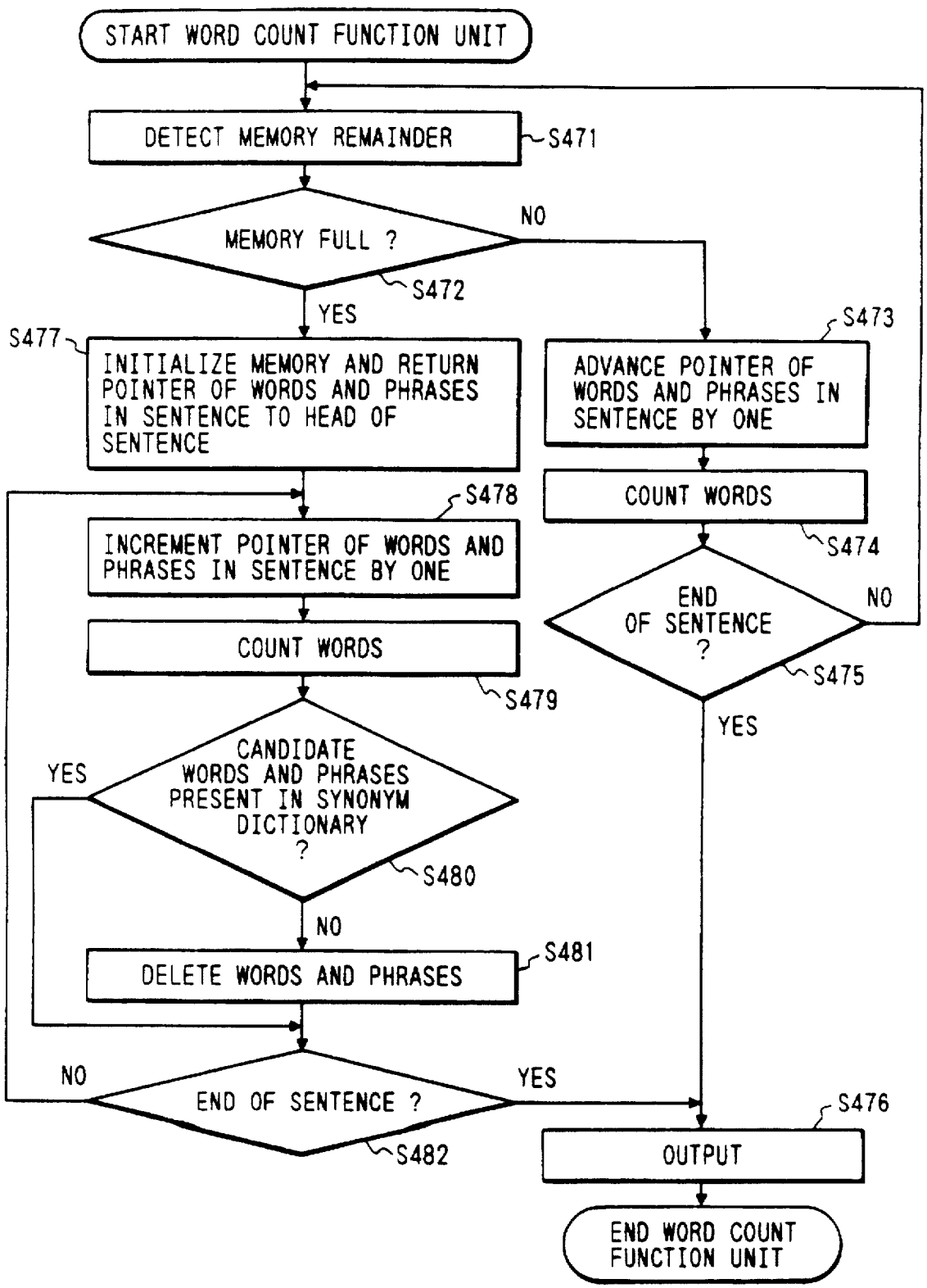
FIG. 47 is a flowchart showing a word counting steps.

Also, the word counting steps according to the present embodiment is such that instead of the removal of the words which are not contained in the synonym dictionary in the word counting process of the Embodiment 10 shown in FIG. 47, the words registered in the user's dictionary will be removed. Any other steps than this are the same as those shown in FIG. 47. Therefore, interpreting that in the steps S480 and S481 shown in FIG. 47 the words registered in the user's dictionary are removed instead of the removal of the words which are not contained in the synonym dictionary, the description will be made of a specific example by utilizing the flowchart shown in FIG. 47.

FIG. 59 is a view showing the contents of the memory provided for storing the frequency of use. Here, it has a capacity of storing 19 pieces of words and phrases.

FIG. 49 shows an example of the inputted data on a sentence, which represents a case where the sentence is sufficiently small against the capacity of the memory for the list of the frequency of use.

When the word count function unit 24 is actuated with respect to the sentence shown in FIG. 49, the unused memory is detected in step S471. The process will proceed from step S472 to S473 where the pointer to an object for processing in the sentence given by the user is incremented by one. In other words, a word "that" will be an object of the processing. In step S474, the information regarding the frequency of use "1" of the word "that" is stored in the list of the frequency of use. The process will proceed to step S475 where it is determined that the sentence has not come to an end as yet. Thus, the process will return to the step S471. These steps will be repeated until a word "animal" is processed. Lastly, the process will proceed to step S476 where the result is output to terminate the word counting operation. At this juncture, the contents of the memory shown in FIG. 59 will change to those shown in FIG. 60.

Now, it is assumed that the inputted data on a sentence are such as shown in FIG. 55. This example represents that the sentence is too great against the capacity of the memory for the list of the frequency of use.

The word count function unit 24 is actuated with respect to the sentence shown in FIG. 55, and the steps S471 to S475 will be repeated until a word "looked". Then, the process will be completed on the words shown in FIG. 61 with the provision of underlines. At this juncture, the contents of the list of the frequency of use are as shown in FIG. 62.

Here, the process will return to the step S471 where a memory full is detected. Therefore, the process will proceed from the step S472 to step S477 where the list is initialized and the pointer is returned to the head of the sentence. In step S478, the foregoing pointer is incremented by one. In other words, a word "that" will be an object of the processing. In step S479, using the word counting unit 126 the information regarding the frequency of use "1" of the words "that" is stored in the memory. Then, in continuation, whether the word "that" is present in the user's dictionary 274 or not is judged in step S480. The judgment is negative. Therefore, the step S481 is skipped. Thus, the process will return to the step S478 through the step S482. The information regrading the list of the frequency of use of the foregoing word will remain on the list. Thereafter, these steps will be repeated until the end of the foregoing sentence is detected. When the word "Tom" on the user's dictionary 274 becomes an object for processing, the step S481 is executed where the information regarding the frequency of use of the foregoing word will be deleted from the foregoing list. Lastly, the process will proceed from the step S482 to step S476 where the result is output to terminate the operation in the word count function unit 24. In this way, the contents of the memory shown in FIG. 62 will change to the contents shown in FIG. 63.

As described above, when the memory is full, the process is executed to clear the memory and return the pointer to the head of the sentence. Then, while checking whether each of the words in the sentence is in the user's dictionary or not, the word counting is again executed from the beginning, but it may be possible to suspend the word counting once and check the list of the frequency of use, thus removing the words which are not present in the user's dictionary and resuming the word counting from where it is suspended. After the counting is resumed, it may be possible to continue the counting while checking whether or not each of the words is present in the user's dictionary or to check the list of the frequency of use again when the memory becomes full after executing the word counting simply.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A document processing apparatus comprising:
   document storing means for storing documents;
   a dictionary for storing synonyms of words;
   designating means for designating a desired word in a document stored in said document storing means;
   retrieving means for retrieving the synonyms of the word designated by said designating means from said dictionary;
   substitutional candidate storing means for storing the retrieved synonyms;
   counting means for counting the frequency of use of the retrieved synonyms in the document stored in said document storing means;
   rearranging means for rearranging the retrieved synonyms in said substitutional candidate storing means in order of the lower values of counts by said counting means;
   substitutional candidate displaying means for displaying the synonyms rearranged by said rearranging means as substitutional candidates;
   selecting means for selecting one candidate from the substitutional candidates displayed by said substitutional candidate displaying means; and
   substituting means for substituting the word designated by said designating means by the candidate selected by said selecting means.

2. A document processing apparatus comprising:
   document storing means for storing documents;
   a dictionary for storing synonyms of words;

designating means for designating a desired word in a document stored in said document storing means;

retrieving means for retrieving the synonyms of the word designated by said designating means from said dictionary;

substitutional candidate storing means for storing the retrieved synonyms;

counting means for counting the frequency of use of the retrieved synonyms in the document stored in said document storing means;

removing means for removing, the synonyms having the values of counts by said counting means greater than a predetermined value, from the retrieved synonyms in said substitutional candidate storing means;

substitutional candidate displaying means for displaying the synonyms remaining after the removal by said removing means as substitutional candidates;

selecting means for selecting one candidate from the substitutional candidates displayed by said substitutional candidate displaying means; and substituting means for substituting the word designated by said designating means by the candidate selected by said selecting means.

3. A document processing apparatus according to claim 2, wherein said removing means is provided with a second counting means for counting the frequency of use of the designated word in the document stored and the value of counting by said second counting means is defined as the predetermined value.

4. A document processing apparatus comprising:

document storing means for storing documents;

a dictionary for storing synonyms of words;

designating means for designating a desired word in a document stored in said document storing means;

retrieving means for retrieving the synonyms of the word designated by said designating means from said dictionary;

substitutional candidate displaying means for displaying the retrieved synonyms as substitutional candidates;

selecting means for selecting one candidate from the substitutional candidates displayed by said substitutional candidate displaying means;

substituting means for substituting the word designated by said designating means by the candidate selected by said selecting means;

word storing means for storing the word substituted by said substituting means;

inputting means for inputting characters one by one;

determining means for determining whether a character inputted by said inputting means is a word delimiter or not each time one character is inputted;

extraction means for extracting characters between a preceding word delimiter and the character newly inputted by said inputting means as a latest input word if the newly input character is determined to be a word delimiter by said determining means;

judging means for judging whether the latest input word extracted by said extraction means is stored in said word storing means or not; and warning means for issuing a warning when said judging means judges the latest input word is stored.

5. A document processing apparatus comprising:

document storing means for storing documents;

a dictionary for storing synonyms of words;

designating means for designating a desired word in a document stored in said document storing means;

retrieving means for retrieving the synonyms of the word designated by said designating means from said dictionary;

substitutional candidate displaying means for displaying the retrieved synonyms as substitutional candidates;

selecting means for selecting one candidate from the substitutional candidates displayed by said substitutional candidate displaying means;

first substituting means for substituting the word designated by said designating means by the candidate selected by said selecting means;

word storing means for storing the word substituted by said first substituting means corresponding to the candidate selected by said selecting means;

inputting means for inputting characters one by one;

determining means for determining whether a character inputted by said inputting means is a word delimiter or not each time one character is inputted;

extraction means for extracting characters between a preceding word delimiter and the character newly inputted by said inputting means as a latest input word if the newly input character is determined to be a word delimiter by said determining means;

judging means for judging whether the latest input word extracted by said extraction means is the same as any one of the substituted words in said word storing means or not; and second substituting means for substituting the latest input word by the selected candidate stored in said word storing means corresponding to the substituted word being judged the same as the latest input word.

6. A document processing apparatus comprising:

document storing means for storing documents;

a dictionary for storing words, idioms and synonyms of the words;

composition means for composing a combination of a plurality of words in a sentence in a document stored in said document storing means by combining sequential or non-sequential words in order of appearance in the sentence;

judging means for judging, by referring to said dictionary, whether each of the composed combinations of words is an idiom stored in said dictionary or not; and counting means for counting the frequency of use of a word as not a word but an idiom when any one of the composed combinations containing the word is judged by said judging means as an idiom and counting the frequency of use of the word as a word when all of the composed combinations containing the word are judged by said judging means as not any idiom.

7. A document processing apparatus comprising:

document storing means for storing documents;

a dictionary for storing synonyms of words;

counting means for counting the frequency of use of a word in a document stored in said document storing means;

result storing means for storing a result of counting by said counting means;

determining means for determining whether said result storing means has an available storage capacity for a new entry or not when a given word first appears in the document during the counting by said counting means;

judging means for judging, with respect to each of the words in dependence on the result therefor stored in said result storing means, whether synonyms of the word are stored in said dictionary or not when said determining means determines that said result storing means does not have an available capacity; and controlling means for removing from said result storing means the result of counting for any word judged by said judging means as not having synonyms stored to make storage capacity available.

8. A document processing apparatus comprising:

document storing means for storing documents;

a dictionary for storing synonyms of words;

a user's dictionary for storing words registered by a user;

counting means for counting the frequency of use of a word in a document stored in said document storing means;

result storing means for storing a result of counting by said counting means;

determining means for determining whether said result storing means has an available storage capacity for a new entry or not when a given word first appears in the document during the counting by said counting means;

judging means for judging, with respect to each of the words in dependence on the results therefore stored in said result storing means, whether the word is stored in said user's dictionary or not when said determining means determines that said result storing means does not have an available capacity; and controlling means for removing from said result storing means the result of counting for any word judged by said judging means as not having synonyms stored to make storage capacity available.

9. A document processing method comprising the steps of:

designating a desired word in a document stored in a document memory;

retrieving synonyms of the designated word from a dictionary for storing synonyms of words;

storing the retrieved synonyms in a substitutional candidate memory;

counting the frequency of use of the retrieved synonyms in the document stored in the document memory;

rearranging the retrieved synonyms in the substitutional candidate memory in order of the lower values of counts counted in said counting step;

displaying the rearranged synonyms as substitutional candidates;

selecting one candidate from the displayed substitutional candidates; and substituting the designated word by the selected candidate.

10. A document processing method comprising the steps of:

designating a desired word in a document stored in a document memory;

retrieving synonyms of the designated word from a dictionary for storing synonyms of words;

storing the retrieved synonyms in a substitutional candidate memory;

counting the frequency of use of the retrieved synonyms in the document stored in the document memory;

removing the synonyms having the values of counts counted by said counting step greater than a predetermined value, from the retrieved synonyms in the substitutional candidate memory;

displaying the synonyms remaining after the removal by said removing step as substitutional candidates;

selecting one candidate from the displayed substitutional candidates; and substituting the designated word by the selected candidate.

11. A document processing method according to claim 10, wherein said removing step including second counting step for counting the frequency of use of the designated word in the document stored and the value of counting by said second counting step is defined as the predetermined value.

12. A document processing method comprising the steps of:

designating a desired word in a document stored in a document memory;

retrieving synonyms of the designated word from a dictionary for storing synonyms of words;

displaying the retrieved synonyms as substitutional candidates;

selecting one candidate from the displayed substitutional candidates;

substituting the designated word by the selected candidate;

storing the substituted word in a word memory;

inputting characters one at a time;

determining whether a character inputted by said inputting step is a word delimiter or not each time one character is inputted;

extracting characters between a preceding word delimiter and the character newly inputted by said inputting step as a latest input word if the newly input character is determined to be a word delimiter by said determining step;

judging whether the latest input word is stored in the word memory or not; and issuing a warning when it is judged the latest input word is stored.

13. A document processing method comprising the steps of:

designating a desired word in a document stored in a document memory;

retrieving synonyms of the designated word from a dictionary for storing synonyms of words;

displaying the retrieved synonyms as substitutional candidates;

selecting one candidate from the displayed substitutional candidates;

substituting the designated word by the selected candidate;

storing the substituted word corresponding to the selected candidate in a word memory;

inputting characters one at a time;

determining whether a character inputted by said inputting step is a word delimiter or not each time one character is inputted;

extracting characters between a preceding word delimiter and the character newly inputted by said inputting step as a latest input word if the newly input character is determined to be a word delimiter by said determining step;

judging whether the latest input word is same as any one of the substituted words stored in the word memory or not; and substituting the latest input word by the selected candidate stored in the word memory corresponding to the substituted word being judged the same as the latest input word.

14. A document processing method comprising the steps of:

composing a combination of a plurality of words in a sentence in a document stored in a document memory by combining sequential or non-sequential words in order of appearance in the sentence;

judging, by referring to a dictionary for storing words, idioms and synonyms of the words, whether each of the composed combinations of words is an idiom stored in the dictionary or not; and counting the frequency of use of a word as not a word but an idiom when any one of the composed combinations containing the word is judged in said judging step as an idiom and counting the frequency of use of the word as a word when all of the composed combinations containing the word are judged in said judging step as not any idiom.

15. A document processing method comprising the steps of:

counting the frequency of use of a word in a document stored in a document memory;

storing a result of the counting in a result memory;

determining whether the result memory has an available storage capacity for a new entry or not when a given word first appears in the document during the counting in said counting step;

judging, with respect to each of the words in dependence on the results therefore stored in the result memory, whether synonyms of the word are stored or not in a dictionary for storing synonyms of words when said determining step determines that the result memory does not have an available capacity; and removing from the result memory the result of counting for any word judged in said judging step as not having synonyms stored in the user's dictionary to make storage capacity available.

16. A document processing method comprising the steps of:

counting the frequency of use of a word in a document stored in a document memory;

storing a result of the counting in a result memory;

determining whether the result memory has an available storage capacity for a new entry or not when a given word first appears in the document during the counting in said counting step;

judging, with respect to each of the words in dependence on the counting result therefor stored in the result memory, whether the word is stored or not in a user's dictionary for storing words registered by a user when said determining step determines that the result memory does not have an available capacity; and removing from the result memory the result of counting for any word judged in said judging step the word as stored in the user's dictionary to make storage capacity available.

\* \* \* \* \*